US011312520B2

(12) United States Patent
Wetsch et al.

(10) Patent No.: US 11,312,520 B2
(45) Date of Patent: *Apr. 26, 2022

(54) HEATING ELEMENT FOR INFLATION AND SEALING SYSTEM

(71) Applicant: PREGIS INNOVATIVE PACKAGING LLC, Deerfield, IL (US)

(72) Inventors: Thomas D. Wetsch, St. Charles, IL (US); Stephen J. Milchuck, Manhattan, IL (US)

(73) Assignee: Pregis Innovative Packaging LLC, Deerfield, IL (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/276,445

(22) Filed: Feb. 14, 2019

(65) Prior Publication Data

US 2019/0291907 A1    Sep. 26, 2019

Related U.S. Application Data

(60) Provisional application No. 62/630,750, filed on Feb. 14, 2018.

(51) Int. Cl.
*B65B 31/06* (2006.01)
*B31D 5/00* (2017.01)
(Continued)

(52) U.S. Cl.
CPC ............ *B65B 31/06* (2013.01); *B29C 65/224* (2013.01); *B29C 65/225* (2013.01);
(Continued)

(58) Field of Classification Search
CPC ......... B65B 31/06; B65B 41/12; B65B 51/26; B29C 65/224; B31D 5/0073
See application file for complete search history.

(56) References Cited

U.S. PATENT DOCUMENTS

| 2,621,867 A | 12/1952 | Grettve |
| 2,987,107 A | 6/1961 | Sylvester |

(Continued)

FOREIGN PATENT DOCUMENTS

| DE | 9422163 U1 | 10/1988 |
| DE | 9422163 U1 | 9/1998 |

(Continued)

OTHER PUBLICATIONS

US 9,808,989 B2, 11/2017, Corbin (withdrawn)
International Application PCT/US2019/018090, filed Feb. 14, 2019 Search Report and Written Opinion, dated May 22, 2019.

*Primary Examiner* — Nathaniel C Chukwurah
*Assistant Examiner* — Lucas E. A. Palmer
(74) *Attorney, Agent, or Firm* — Fox Rothschild LLP

(57) ABSTRACT

A protective packaging formation device is disclosed herein. The device includes an inflation assembly that directs fluid between first and second overlapping plies of a web material. The device also includes a sealing mechanism. The sealing mechanism includes a heating zone and a cooling zone. The sealing mechanism also includes a heating element that extends along both the heating zone and the cooling zone, with the heating element having a first profile in the heating zone and a second profile in the cooling zone.

24 Claims, 14 Drawing Sheets

(51) Int. Cl.
   *B65B 41/12*   (2006.01)
   *B65B 51/26*   (2006.01)
   *B29C 65/74*   (2006.01)
   *B29C 65/78*   (2006.01)
   *B29C 65/00*   (2006.01)
   *B29C 65/22*   (2006.01)

(52) U.S. Cl.
   CPC .......... *B29C 65/226* (2013.01); *B29C 65/228* (2013.01); *B29C 65/229* (2013.01); *B29C 65/7459* (2013.01); *B29C 65/787* (2013.01); *B29C 65/7873* (2013.01); *B29C 65/7894* (2013.01); *B29C 66/0044* (2013.01); *B29C 66/00441* (2013.01); *B29C 66/0342* (2013.01); *B29C 66/1122* (2013.01); *B29C 66/439* (2013.01); *B29C 66/4322* (2013.01); *B29C 66/73921* (2013.01); *B29C 66/81422* (2013.01); *B29C 66/81423* (2013.01); *B29C 66/81871* (2013.01); *B29C 66/83423* (2013.01); *B31D 5/0073* (2013.01); *B65B 41/12* (2013.01); *B65B 51/26* (2013.01); *B29C 66/71* (2013.01); *B29C 66/8122* (2013.01); *B29C 66/81265* (2013.01); *B29C 66/81433* (2013.01); *B31D 2205/0023* (2013.01); *B31D 2205/0035* (2013.01); *B31D 2205/0052* (2013.01); *B31D 2205/0088* (2013.01)

(56) References Cited

U.S. PATENT DOCUMENTS

| | | | |
|---|---|---|---|
| 4,169,002 A | 9/1979 | Larson | |
| 5,165,620 A | 11/1992 | Kampiziones | |
| 5,370,336 A | 12/1994 | Whittington | |
| 6,622,767 B2 | 9/2003 | Stork | |
| 7,082,979 B2 | 8/2006 | Stork | |
| 7,165,375 B2* | 1/2007 | O'Dowd | B31D 5/0073 53/385.1 |
| 7,213,383 B2 | 5/2007 | Walker | |
| 7,247,219 B2* | 7/2007 | O'Dowd | B29C 65/18 156/380.2 |
| 7,328,541 B2 | 2/2008 | Garceau | |
| 7,890,044 B2 | 2/2011 | Shimizu et al. | |
| 8,124,915 B2 | 2/2012 | Bertram | |
| 8,128,770 B2* | 3/2012 | Wetsch | B29C 66/91421 156/147 |
| 8,225,583 B2 | 7/2012 | Waldherr | |
| 8,726,960 B1 | 5/2014 | Huang | |
| 8,991,141 B2 | 3/2015 | Sperry et al. | |
| 9,266,300 B2 | 2/2016 | Chuba et al. | |
| 9,635,985 B2 | 5/2017 | Phelps | |
| 9,844,911 B2 | 12/2017 | Corbin et al. | |
| 2002/0092279 A1* | 7/2002 | Sperry | B29C 65/7433 53/568 |
| 2005/0160699 A1 | 7/2005 | Perkins | |
| 2005/0188659 A1* | 9/2005 | Lerner | B29C 66/81457 53/469 |
| 2006/0090421 A1* | 5/2006 | Sperry | B29C 65/7457 53/403 |
| 2007/0068632 A1 | 3/2007 | Bertram | |
| 2007/0235443 A1* | 10/2007 | Sperry | B29C 66/8122 219/549 |
| 2007/0251631 A1* | 11/2007 | Garceau | B29C 66/3432 156/147 |
| 2010/0218903 A1 | 9/2010 | Aquarius | |
| 2013/0032293 A1 | 2/2013 | Birkle et al. | |
| 2015/0144268 A1* | 5/2015 | Corbin | B29C 66/9672 156/358 |
| 2015/0239196 A1* | 8/2015 | Wetsch | B65B 43/06 53/79 |
| 2017/0275036 A1 | 9/2017 | Wetsch et al. | |
| 2017/0282479 A1 | 10/2017 | Wetsch | |

FOREIGN PATENT DOCUMENTS

| | | |
|---|---|---|
| EP | 1466839 A1 | 10/2004 |
| JP | S5398630 U | 8/1978 |
| JP | 2013123875 A | 6/2013 |
| WO | 2008036641 A2 | 3/2008 |
| WO | 2015077551 A1 | 5/2015 |

* cited by examiner

HEATING ELEMENT FOR INFLATION AND SEALING SYSTEM

CROSS-REFERENCE TO RELATED APPLICATION

This application claims priority to U.S. Provisional Application No. 62/630,750 filed on Feb. 14, 2018, entitled "Isolation Device in a Heating and Sealing System", which is hereby incorporated by reference in its entirety.

TECHNICAL FIELD

The present disclosure relates to packaging materials. More particularly, the present disclosure is directed to devices and methods for manufacturing inflatable cushions to be used as packaging material.

BACKGROUND

A variety of inflated cushions are well known and used for sundry packaging applications. For example, inflated cushions are often used as protective packaging in a manner similar to or in place of foam peanuts, crumpled paper, and similar products. Also for example, inflated cushions are often used as protective packaging in place of molded or extruded packaging components. A typical type of inflated cushions is formed from films having two plies that are joined together by seals. The seals can be formed simultaneously with inflation, so as to capture air therein, or prior to inflation to define a film configuration having inflatable chambers. The inflatable chambers can be inflated with air or another gas and thereafter sealed to inhibit or prevent release of the air or gas.

In the process of inflating and sealing the chambers, the films are sealed by a variety of heating apparatuses. In traditional systems, the temperatures and pressures on the seals are not sufficiently controlled after the seal is made. Poor post seal control leads to increased packaging failure. As such, improved heating and cooling paths and protection for the seal are therefore desirable.

SUMMARY

Embodiments of the present disclosure may include a protective packaging formation device. The device can include an inflation assembly having a fluid conduit that directs fluid between first and second overlapping plies of a web material. The device can include a driving mechanism that drives the film in a downstream direction through an arcuate pinch zone. The device can include a sealing mechanism that includes a heating element that includes a wide cross-section portion and a reduced cross-section portion, the size of the cross-sections selected such that the reduced cross-section portion produces high temperature zone that outputs sufficient heat to heat seal the plies to create a longitudinal seal that seals the first and second plies of film together, trapping the fluid therebetween as the driving mechanism drives the web past the heating assembly in a downstream direction.

In accordance with various embodiments, the heating element can be supported on the heater support structure, which defines a support surface that applies pressure to the web against an opposing compression element. The heater support structure includes an insulating member that includes at least a portion of the support surface, along which the support surface has an arcuate profile. The heater may include a first conducting member separated from a second conducting member, and the heating element has a first end and a second end, with each end mounted to the separate conducting members. The heating element may be laid over the insulating member with the reduced cross-section laid across the insulating member.

In accordance with various embodiments, the heating element may be laid over portions of the conducting members with larger cross section portion of the heating element being laid across the portions of the conducting members. The reduced cross-section portion of the heating element may occupy more of the first half of the pinch zone than the second half. The heating element may extend along both the heat zone and the cooling zone. The drive mechanism may include a belt and the web is separated from the heater by the belt. The drive mechanism may include a first belt and a second belt that advance the web through the pinch zone. The wide cross-section portion has a heat output that is insufficient to heat seal the plies together. The wide cross-section of the heating element may extend into the cooling zone.

Embodiments of the present disclosure may include protective packaging formation device. The device can include an inflation assembly having a fluid conduit that directs fluid between first and second overlapping plies of a web material. The device can include a sealing mechanism. The sealing mechanism includes a heating zone and a cooling zone, wherein the heating zone is operable to heat the plies to create a longitudinal heat seal that seals the first and second plies together as the web is driven over the heating zone in a downstream direction, and the cooling zone disposed downstream of the heating zone operable to allow the heated plies to cool at the longitudinal heat seal as the web is driven over the heating zone in a downstream direction, such that the cooled longitudinal heat seal retains the fluid between the plies. The device include a heating element that extends along both the heating zone and the cooling zone, with the heating element having a first profile in the heating zone and a second profile in the cooling zone. The device may include a driving mechanism that drives the film in the downstream direction over the heating and cooling zones, with the web supported by a web-support surface from an upstream location to a downstream location.

In accordance with various embodiments, the sealing mechanism includes a heater support structure that defines the web-support surface with a heating element that extends from an upstream portion of the web-support surface to a downstream portion of the web-support surface. The sealing mechanism may include a pinch zone that overlaps longitudinally with the heating zone and cooling zone, the pinch zone being defined between opposing compression elements. The heating element may extend the entire length of the pinch zone. The heating element may be a nichrome foil heater that follows the web-support surface through the pinch zone. The heating element may include a high heat zone that is laid over the insulating member and a low heat zone located along at least one of the electrically conductive supports. The high heat zone is defined by a length of the heating element with a reduced cross section. The difference between the first profile and the second profile may be a change in cross-section of the heating element.

DETAILED DESCRIPTION

The present disclosure is related to protective packaging and systems and methods for converting inflatable material into inflated cushions that may be used as cushioning or protection for packaging and shipping goods.

Figure 1:
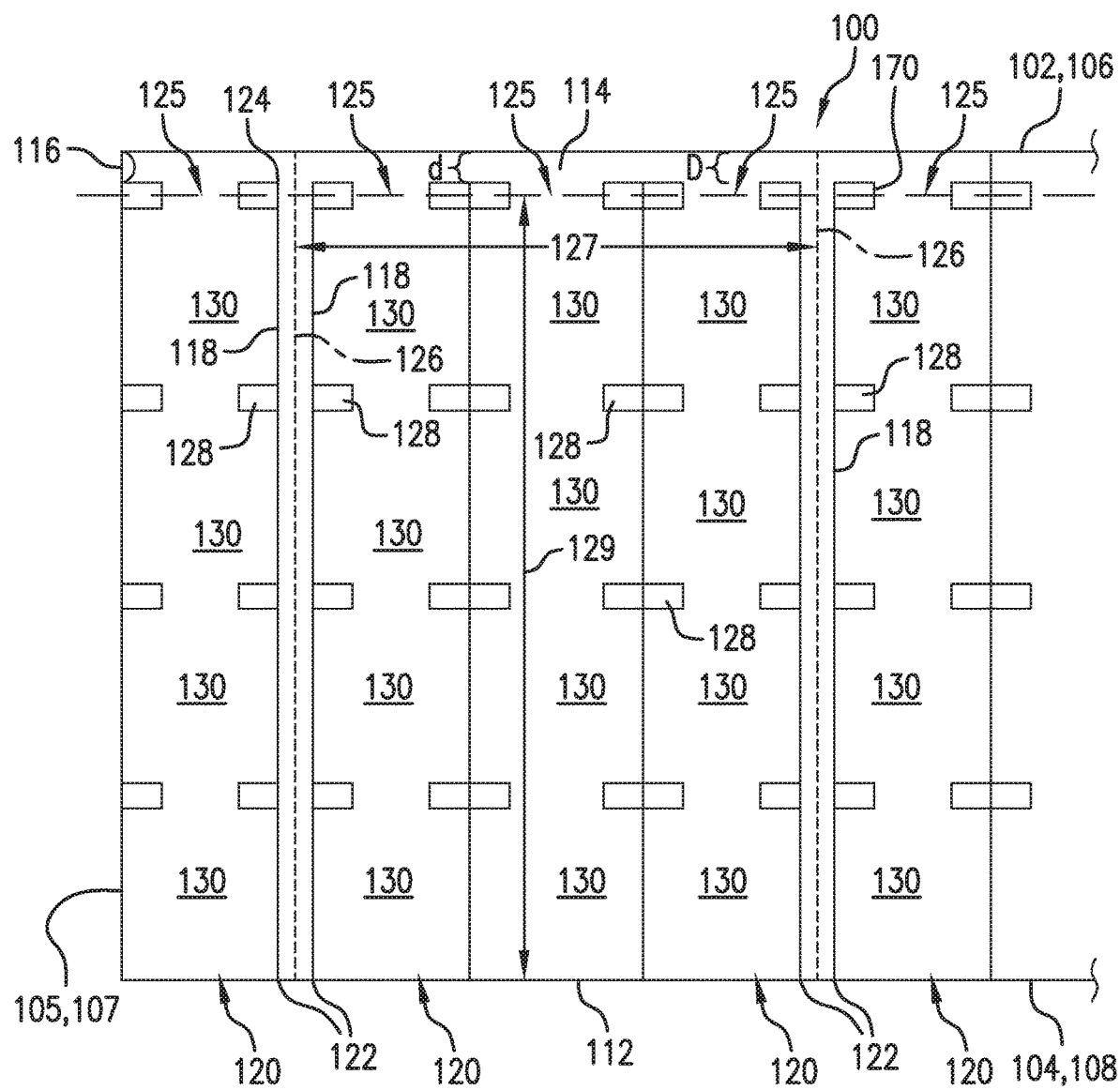
FIG. 1 is a top view of an uninflated material web.

As shown in FIG. 1, a multi-ply flexible web material 100 for inflatable cushions 121 is provided. The web material 100 includes a first film ply 105 having a first longitudinal edge 102 and a second longitudinal edge 104, and a second film ply 107 having a first longitudinal edge 106 and a second longitudinal edge 108. The second ply 107 is aligned to be over lapping and can be generally coextensive with the first ply 105, i.e., at least respective first longitudinal edges 102, 106 are aligned with each other and/or second longitudinal edges 104, 108 are aligned with each other. In some embodiments, the plies can be partially overlapping with inflatable areas in the region of overlap.

FIG. 1 illustrates a top view of the web material 100 having first and second plies 105, 107 joined to define a first longitudinal edge 110 and a second longitudinal edge 112 of the web material 100 (also referred to as film 100). The first and second plies 105, 107 can be formed from a single sheet of flexible material, a flattened tube of flexible material with one edge having a slit or being open, or two sheets of flexible material which may be sealed along the longitudinal edges 104, 108 to define the longitudinal edge 112 of the flexible structure 100. For example, the first and second plies 105, 107 can include a single sheet of flexible material that is folded to define the joined second edges 104, 108 (e.g., "c-fold film"). In a more particular example, edges 104, 108 are at the c-fold in such an embodiment. Alternatively, for example, the first and second plies 105, 107 can include a tube of flexible material (e.g., a flatten tube) that is slit along the aligned first longitudinal edges 102, 106. Also, for example, the first and second plies 105, 107 can include two independent sheets of flexible material joined, sealed, or otherwise attached together along the aligned second edges 104, 108.

The web material 100 can be formed from any of a variety of flexible web materials known to those of ordinary skill in the art. Such web materials include, but are not limited to, ethylene vinyl acetates (EVAs), metallocenes, polyethylene resins such as low density polyethylene (LDPE), linear low density polyethylene (LLDPE), and high density polyethylene (HDPE), and blends thereof. Other materials and constructions can be used. The disclosed web material 100 can be rolled on a hollow tube, a solid core, or folded in a fan folded box, or in another desired form for storage and shipment.

As shown in FIG. 1, the web material 100 can include a series of transverse seals 118 disposed along the longitudinal extent of the web material 100. Each transverse seal 118 extends from the longitudinal edge 112 towards an inflation channel 114. In the embodiment shown, the inflation channel 114 extends along the longitudinal edge 110 opposite the longitudinal edge 112, and thus the transverse seal 118 extends from the longitudinal edge 112 toward the first longitudinal edge 110. In some embodiments, the flexible structure 110 may include an inflation channel 114 located elsewhere in relation to the longitudinal edge(s) 112 and/or 110. For example, the inflation channel may extend along the length of the structure 100 at an intermediate location (e.g., midway) between the longitudinal edge(s) 112 and/or 110. In some embodiments, the flexible structure 100 may, additionally or alternatively, include an inflation channel 114 along the longitudinal edge 112. In the illustrated embodiment, each transverse seal 118 has a first end 122 proximate the second longitudinal edge 112 and a second end 124 spaced a transverse dimension d from the first longitudinal edge 110 of the film 110. A chamber 120 is defined within a boundary formed by the seal or fold at longitudinal edge 112 and pair of adjacent transverse seals 118.

Each transverse seal 118 of the embodiment in FIG. 1 is substantially straight and extends substantially perpendicular to the second longitudinal edge 112. In other embodiments, other arrangements of the transverse seals 118 may be used. For example, in some embodiments, the transverse seals 118 may have undulating or zigzag patterns.

The transverse seals 118 as well as sealed longitudinal edges 110, 112 can be formed by any of a variety of techniques known to those of ordinary skill in the art. Such techniques include, but are not limited to, adhesion, friction, welding, fusion, heat sealing, laser sealing, and ultrasonic welding.

An inflation region, such as a closed passageway, which can be a longitudinal inflation channel 114, can be provided. The longitudinal inflation channel 114, as shown in FIG. 1, may be disposed between the second end 124 of the transverse seals 118 and the first longitudinal edge 110 of the film. Preferably, the longitudinal inflation channel 114 extends longitudinally along the longitudinal side 110 and an inflation opening 116 is disposed on at least one end of the longitudinal inflation channel 114. The longitudinal inflation channel 114 has a transverse width D. In the preferred embodiment, the transverse width D is substantially the same as the transverse dimension d between the longitudinal edge 110 and second ends 124 of the transverse seals 118. It is appreciated, however, that in other configurations, a different transverse width D may be used.

The longitudinal edge 112 and transverse seals 118 cooperatively define boundaries of inflatable chambers 120. As shown in FIG. 1, each inflatable chamber 120 is in fluid communication with the longitudinal inflation channel 114 via a mouth (e.g. opening 125) opening towards the longitudinal inflation channel 114, thus permitting inflation of the inflatable chambers 120 as further described herein.

In one embodiment, the flexible structure 100 may further include seal extensions 128 adjacent or connected to a respective transverse seal 118 and extending toward or into the respective inflatable chamber(s) 120. The seal extensions 128 define perpendicularly lower regions of the chamber corresponding to smaller width or restrictions in the width of the chamber, which creates bendable areas, which can be aligned to create the bendable lines, thereby increasing the flexibility of web material 100 such that it can be more easily bent or folded. Such flexibility allows for the film 100 to wrap around regular and irregular shaped objects. The chamber portions 130 are in fluid communication with adjacent chamber portions 130 as well as with the inflation channel 114. The seal extensions can be any shape (e.g., rectangular as shown, circular, ovular, or having any other regular or irregular shape) or size. In accordance with some embodiments, the transverse seals 118 are continuous, without interruptions from seal extensions or the like.

In some embodiments, the film 100 includes weakened portions 126 (e.g., lines of weakness, such as perforation lines) disposed along the longitudinal extent of the film 100 and extending transversely across the first and second plies of the film 100. Each weakened portion 126 extends from the second longitudinal edge 112 and towards the first longitudinal edge 110, e.g., partially or fully along the length of the transverse seals 118. In the illustrated embodiment, the weekend portions 126 are in the form of transverse lines of weakness and each transverse line of weakness in the flexible structure 100 is disposed between a pair of adjacent chambers 120. For example, each line of weakness 126 may be disposed between two adjacent transverse seals 118 and between two adjacent chambers 120, as depicted in FIG. 1. The transverse lines of weakness 126 facilitate separation of adjacent inflatable cushions 121. In some embodiments, thicker transverse seals 118 may be used, which define a transverse sealed portion and the weakened portions 126 may be provided along, at least part of the transverse sealed portion of the flexible structure 100.

The weakened portions 126 may be provided in a variety of configurations known by those of ordinary skill in the art. For example, in some embodiments, the weakened portions 126 may be provided as transverse lines of weakness 126 (e.g., as shown in FIG. 1) and may include rows of perforations, in which a row of perforations includes alternating lands and slits spaced along the transverse extent of the row. The lands and slits can occur at regular or irregular intervals along the transverse extent of the row. The lands form small connections across the weakened portion. Alternatively, for example, in some embodiments, the weakened portions 126 may include score lines or the like formed in the flexible structure 100.

The transverse lines of weakness 126 can be formed by a variety of techniques known to those of ordinary skill in the art. Such techniques include, but are not limited to, cutting (e.g., techniques that use a cutting or toothed element, such as a bar, blade, block, roller, wheel, or the like) and/or scoring (e.g., techniques that reduce the strength or thickness of material in the first and second plies, such as electromagnetic (e.g., laser) scoring and mechanical scoring).

Preferably, the transverse width 129 of the inflatable chamber 120 is typically less than 50 inches. Generally, the transverse width 129 is 3 inches up to about 42 inches, more preferably about 6 inches up to about 30 inches wide, and most preferably about 12 inches. The longitudinal length 127 between weakened portions 126 is typically less than 48 inches. Generally the length 127 between weakened portions 126 is at least about 2 inches up to about 30 inches, more preferably at least about 5 inches up to about 20 inches, and most preferably at least about 6 inches up to about 10 inches. In addition, the inflated heights of each inflated chamber 120 can be at least about 1 inches up to about 3 inches, and in some cases up to about 6 inches. It is appreciated that other suitable dimensions can be used.

Figure 2:
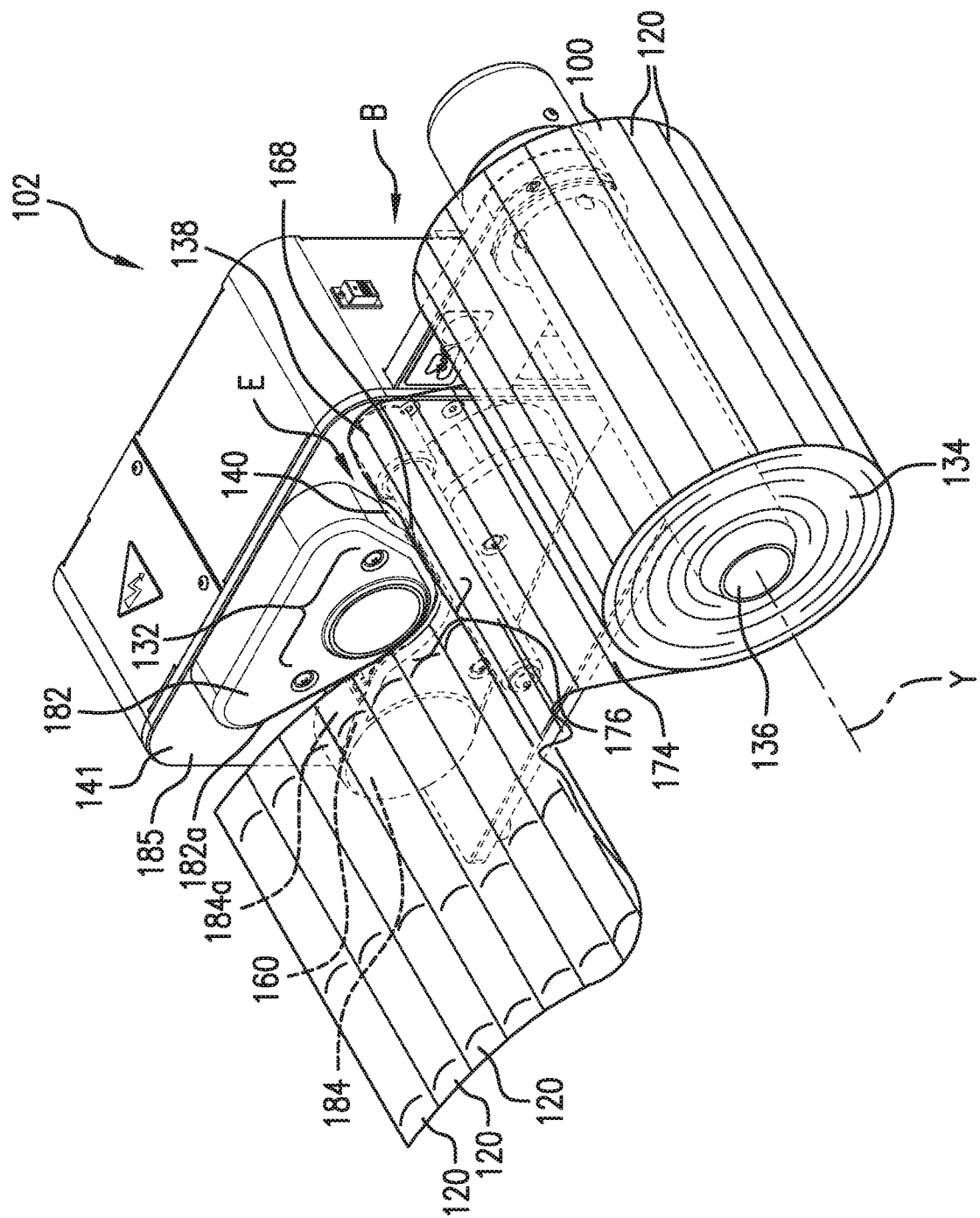
FIGS. 2-4 are a rear perspective view, a proximal-side view, and a front perspective view, respectively, of an inflation and sealing device.

Turning now to FIGS. 2-6, an inflation and sealing device 102 for converting the flexible structure 100 of uninflated material into a series of inflated pillows or cushions 121 is provided. The uninflated flexible structure 100 can be a bulk quantity of supply, uninflated material 134. For example, as shown in FIG. 2, the uninflated flexible structure 100 can be provided as a roll of supply material 134, which may be rolled around an inner support tube. In some embodiments, the supply material may be rolled into a roll with a hollow center. The support tube or hollow center of the roll of material 134 may be supported on a supply support element 136, in this case a roll axle 136, of the inflation and sealing device 102. The roll axle 136 accommodates the center or tube of the roll of web material 134. In other embodiments, different structures can be used to support the roll of material, such as a tray, fixed spindle or multiple rollers, or a supply material of different configuration (e.g., folded supply material). FIGS. 3-6 show the inflation and sealing device 102 without the flexible structure 100, such as the web material 134, loaded on the device. In some embodiments, the flexible structure 100 of uninflated material is delivered from a folded form such as a fanfolded configuration.

In accordance with various embodiments, the inflation and sealing device 100 may include handling elements, with each of the handling elements including film-supporting portions. The film-support portions may support and direct an inflatable web of material in a longitudinal direction along a path (e.g., path E in FIG. 2). The handling elements may include a supply support element 136 that supports a supply 134 of the film 100 in an uninflated state. An inflation and sealing assembly 132 may be operable to inflate the film with a fluid by directing the fluid between superimposed plies 105, 107 of the film 100 and to seal the plies 105, 107 together to seal the fluid therein. Two of the film-supporting portions (e.g., a roll axle 136 and guide member 138) may be arranged relative to a supporting structure 141 and each other such that the supply material experiences a different amount of tension along the transverse direction as it passes from the first to the second film-supporting portion. The relative position of the two film-supporting portions may cause a difference in tautness (or tension) in two portions of the web disposed transversely of each other in a substantially same longitudinal location along the path. In further embodiments of the present disclosure, the differential tension may be achieved by providing the guide member 138 with one or more expansion elements as described further below. In some examples, the resulting shape of the guide member 138 may be configured to define a slightly shorter longitudinal travel distance between the first and second adjacent film-supporting portions at one transverse end of the film as compared to the longitudinal travel distance between the first and second adjacent film-supporting portions at another (e.g., opposite) transverse location of the film, as will be further described.

Referring back to FIGS. 2-6, the inflation and sealing device 102 may include a bulk material support 136. The bulk quantity of uninflated material may be supported by the bulk material support 136. For example, the bulk material support may be a tray operable to hold the uninflated material, which tray can be provided by a fixed surface or a plurality of rollers for example. To hold a roll of material the tray may be concave around the roll or the tray may convex with the roll suspended over the tray. The bulk material support may include multiple rollers, which suspend the supply of web material. The bulk material support may include a single roller that accommodates the center of the roll of web material 134, e.g., as shown in FIG. 2. In this example, the bulk support material may be a roll axle or spindle 136 passing through the core or center of the roll of the material 134. Typically, the core is made of cardboard or other suitable materials. The bulk material support 136 may rotate about an axis Y.

The web material 100 is pulled by a drive mechanism 160. In some embodiments, intermediate members such as a guide member 138 (e.g., which may include a fixed rod, or a roller) can be positioned between roll 134 and the drive mechanism 160. For example, the optional guide member 138 can extend generally perpendicularly from a support structure 141. The guide member 138 can be positioned to guide the flexible structure 100 away from the roll of material 134 and along a material path "B" along which the material is processed, also referred to as longitudinal path. As shown in FIG. 2, the guide member 138 is arranged between the material support 136, which supports the supply material, and the inflation and sealing components of the device 102. The guide member 138 may be arranged to route the film 100 from the supply toward the inflation and sealing assembly such that the film 100 follows a curved longitudinal path. The guide member 138 may include one or more surfaces, which define film-supporting surfaces (e.g., surfaces extending along the side of the guide member around which the film bends as it traverses the path B). In some examples, and as described further below, the guide member 138 may include one or more expansion elements. The one or more expansion elements provide at least a portion of the film-supporting surface of the guide member and can configure the guide member to provide variable tension on the film 100 at different transverse locations of the film 100.

The guide member 138 or a portion thereof may be movably coupled to the inflation and sealing device 102, such that the guide member 138 or the movable portion thereof can move (e.g., spin, translate, oscillate, etc.) in relation to the support structure 141 when the film 100 is being drawn from the roll 134 by drive mechanism 160. In some examples, the guide member 138 may include a guide roller, which includes an axle or rod portion 137 and a rotatable or roller portion 139 coaxially coupled to the rod portion 137 such that the roller portion 139 spins about a common axis 148 of the rod and roller portions. The roller portion 139 may provide a film-supporting surface 150 that supports the film 100, in this case moving with the film 100 as it is being drawn from the roll 134. The moving film-supporting surface 150 may reduce or eliminating sliding friction between the guide member 138 and the film 100. However, guide members with a fixed film-supporting surface 150 are also envisioned. For example, the guide member may include a rod similar to the axle 137 without the rotatable portion 139. A low friction material, such as polytetrafluoroethylene (PTFE), may be provided (e.g., in the form of a coating or a strip of material adhered to) on at least a portion of the film-supporting surface 150 of a non-rotatable rod, to reduce sliding friction. In yet other embodiments, the non-rotatable portion or rod of the guide member and the rotatable portion (e.g., roller) may not be coextensive. For example, the only rotating portion of the guide member 138 may be the expansion element 152. Film-supporting surface(s) of the guide member which do not rotate as the film is traveling over the guide member may be coated or otherwise provided with friction-reducing material(s).

Figure 3:
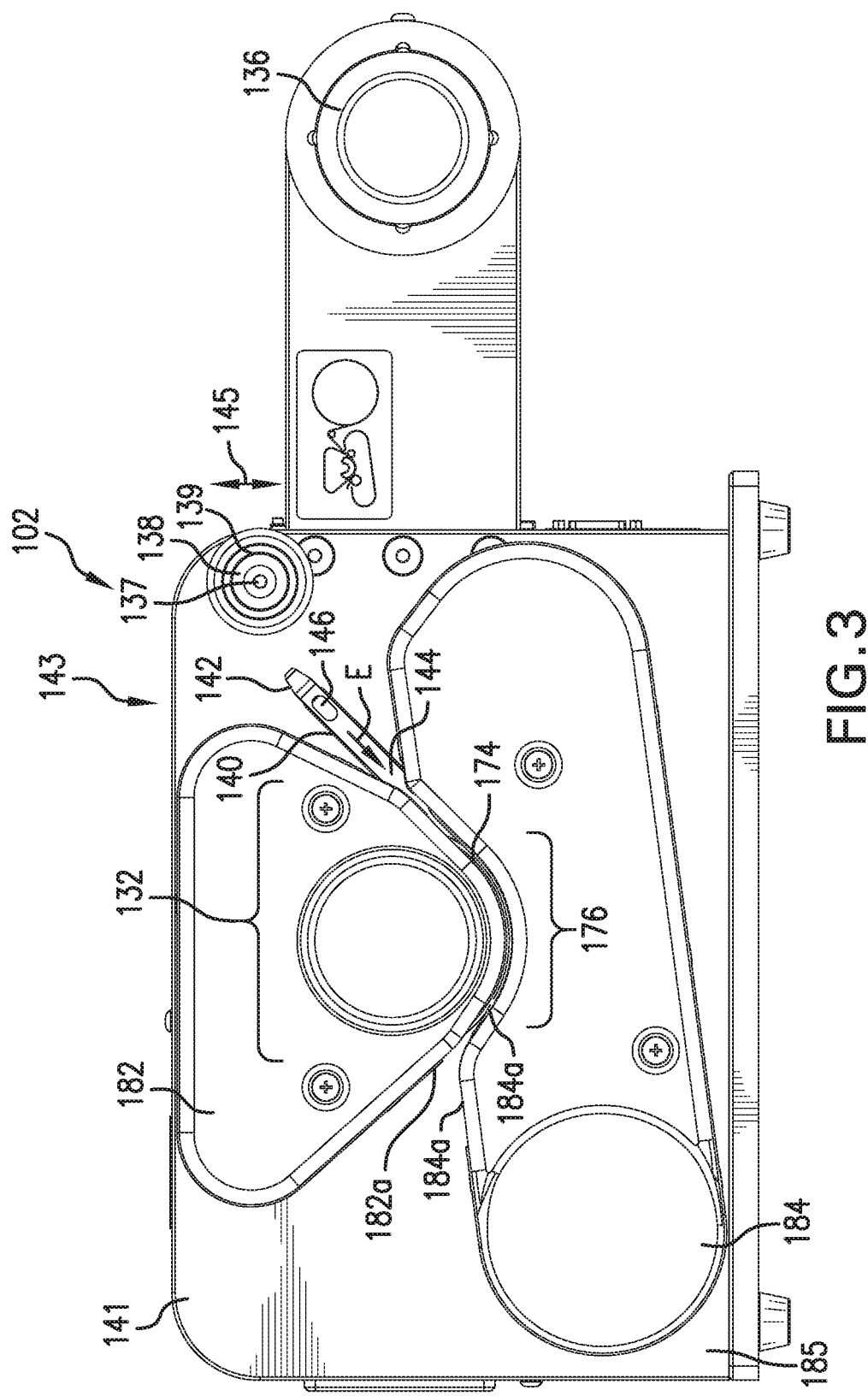
Figure 4:
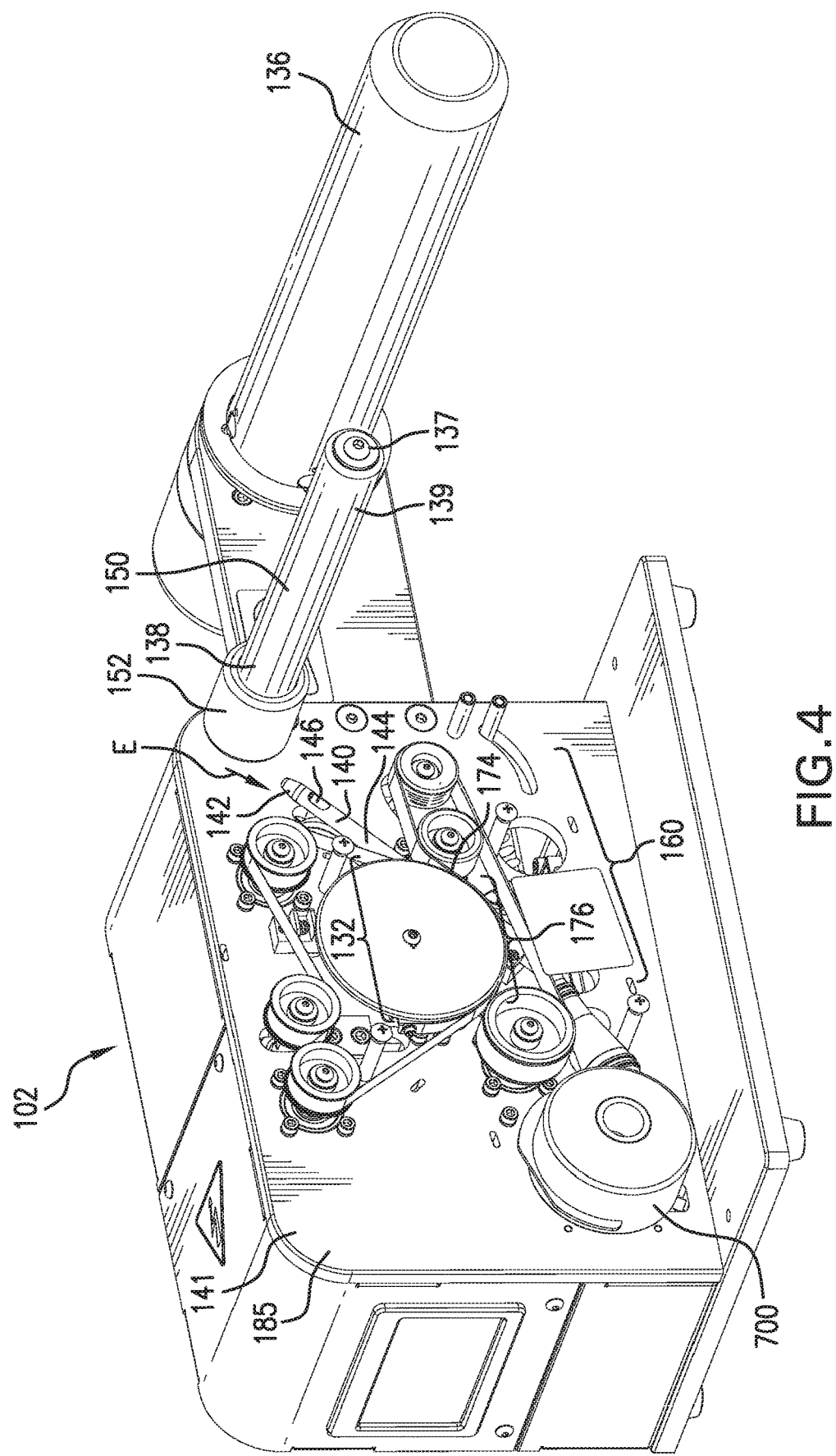

In some embodiments, the guide member 138 may additionally or alternatively be coupled to the device 102 such that it moves in a direction normal to the longitudinal path B traveled by the supply material, as indicated by arrow 139 in FIG. 3. Such movement may be used to relieve an increase in tension experienced by the supply material as it travels along path E. For example, the guide member 138 may be spring-loaded or biased toward a first side 143 of the support structure 141 in its nominal state (e.g., when unloaded or operating under normal tension of the supply material). An increase in tension experienced by the film 100 along the portion between the supply end and the pinch zone towards may be relieved by a downward movement of the guide member 138 against the spring force. The spring constant may be selected to apply a sufficient amount of biasing force against the film to maintain the film taut while being sufficiently soft to prevent the tension in the film exceeding a threshold, which may damage the film and/or the device 102. A guide roller 138 movably coupled to the device 102 in this manner may be interchangeably referred to as a dancer roller.

A guide member 138 according to the present disclosure may include one or more expansion elements 152 as will be described further below. In some embodiments, the expansion element 152 may provide some or all of the film-supporting surface 150 of the guide member 138. A guide member 138 according to the principles of the present disclosure may thus be configured to control the material 134, such as to prevent or reduce sagging of the film 100 between the roll 134 and the inflation nozzle 140 of the device 102.

In various embodiments, the stock material (e.g. web material 100) may advance downstream from the stock roll of material (e.g., roll of material 134) without engaging a guide roll but may instead be advanced directly into an inflation and sealing assembly 132.

It is appreciated that other suitable structures may be utilized in addition to or as an alternative to use of brakes, guide rollers, or web feed mechanisms in order to guide the web material 100 toward a pinch area 176 which can form part of the sealing assembly 132. As indicated, because the web material 100 may sag, bunch up, drift along the guide roller 138, shift out of alignment with the pinch zone 176, alternate between tense and slack, or become subject to other variations in delivery, the inflation and sealing assembly 132 may need suitable adjustability to compensate for these variations. For example, a nozzle 140 may be at least partially flexible, allowing the nozzle 140 to adapt to the direction the web material 100 approaches as the structure is fed towards and over the nozzle 140, thereby making the nozzle 140 operable to compensate for or adapt to variations in the feed angle, direction, and other variations that the web material 100 encounters as it is fed towards and over the nozzle 140. In some examples, as described above, the guide roller 138 may be transversely movable relative to the sealing assembly 132 such as to adjust or eliminate any variations in delivery of the supply material.

The inflation and sealing device 102 includes an inflation and sealing assembly 132. Preferably, the inflation and sealing assembly 132 is configured for continuous inflation of the web material 100 as it is unraveled from the roll 134. The roll 134, preferably, comprises a plurality of chain of chambers 120 that are arranged in series. To begin manufacturing the inflated pillows from the web material 100, the inflation opening 116 of the web material 100 is inserted around an inflation assembly, such as an inflation nozzle 140, and is advanced along the material path "E". In the embodiment shown in FIGS. 1-6, preferably, the web material 100 is advanced over the inflation nozzle 140 with the chambers 120 extending transversely with respect to the inflation nozzle 140 and side outlets 146. The side outlets 146 may direct fluid in a transverse direction with respect to a nozzle base 144 into the chambers 120 to inflate the chambers 120 as the web material 100 advanced along the material path "E" in a longitudinal direction. The inflated web material 100 is then sealed by the sealing assembly 103 in the sealing area 174 to form a chain of inflated pillows or cushions 121.

The side inflation area 168 (shown in FIG. 2) is shown as the portion of the inflation and sealing assembly along the path "E" adjacent the side outlets 146 in which air from the side outlets 146 can inflate the chambers 120. In some embodiments, the inflation area 168 is the area disposed between the inflation tip 142 and pinch area 176. The web material 100 is inserted around the inflation nozzle 140 at the nozzle tip 142, which is disposed at the forward most end of the inflation nozzle 140. The inflation nozzle 140 inserts a fluid, such as pressured air, into the uninflated web material 100 material through nozzle outlets, inflating the material into inflated pillows or cushions 121. The inflation nozzle 140 can include a nozzle inflation channel that fluidly connects a fluid source, which enters at a fluid inlet, with one or more nozzle outlets (e.g. side outlet 146). It is appreciated that in other configurations, the fluid can be other suitable pressured gas, foam, or liquid. The nozzle may have an elongated portion, which may include one or more of a nozzle base 144, a flexible portion, and/or a tip 142. The elongated portion may guide the flexible structure to a pinch area 176. At the same time the nozzle may inflate the flexible structure through one or more outlets. The one or more outlets may pass from the inflation channel out of one or more of the nozzle base 144 (e.g. outlet 146), the flexible portion 142a, or the tip 142. The inflation nozzle 140 may extend away from the front surface of the housing.

As shown in FIG. 3-6, the side outlet 146 can extend longitudinally along the nozzle base 144 toward a longitudinal distance from the inflation tip 142. In various embodiments, the side outlet 146 originates proximate, or in some configurations, overlapping, the sealer assembly such that the side outlet 146 continues to inflate the inflatable chambers 120 about right up to the time of sealing. This can maximize the amount of fluid inserted into the inflatable chambers 120 before sealing, and minimizes the amount of dead chambers, i.e., chambers that do not have sufficient amount of air. Although, in other embodiments, the slot outlet 146 can extend downstream past the entry pinch area 176 and portions of the fluid exerted out of the outlet 146 is directed into the web material 100. As used herein, the terms upstream and downstream are used relative to the direction of travel of the web material 100. The beginning point of the web is upstream and it flows downstream as it is inflated, sealed, cooled and removed from the inflation and sealing device.

The length of the side outlet 146 may be a slot having a length that extends a portion of the inflation nozzle 140 between the tip 142 and the entry pinch area 176. In one example, the slot length may be less than half the distance from the tip 142 to the entry pinch area 176. In another example, the slot length may be greater than half the distance from the tip 142 to the pinch area 176. In another example, the slot length may be about half of the distance from the tip 142 to the pinch area 176. The side outlet 146 can have a length that is at least about 30% of the length of the inflation nozzle 140, for example, and in some embodiments at least about 50% of the length of the inflation nozzle 140, or about 80% of the length of the inflation nozzle 140, although other relative sizes can be used. The side outlet 146 expels fluid out the lateral side of the nozzle base 144 in a transverse direction with respect to the inflation nozzle 140 through the mouth 125 of each of the chambers 120 to inflate the chambers 120. The tip of the inflation nozzle can be used to pry open and separate the plies in an inflation channel at the tip as the material is forced over the tip. For example, when the web is pulled over traditional inflation nozzles, the tip of the traditional inflation nozzles forces the plies to separate from each other. A longitudinal outlet may be provided in addition to or in the absence of the lateral outlet, such as side outlet 146, which may be downstream of the longitudinal outlet and along the longitudinal side of the nozzle wall of the nozzle base 144 of the inflation nozzle 140.

The flow rate of the fluid through the nozzle 140 form the blower 700 is typically about 2 to 20 cfm. But much higher flow rates can be used, for example, when a higher flow rate fluid source is used, such as, the blower 700 can have a flow rate in excess of 100 cfm.

Figure 6:
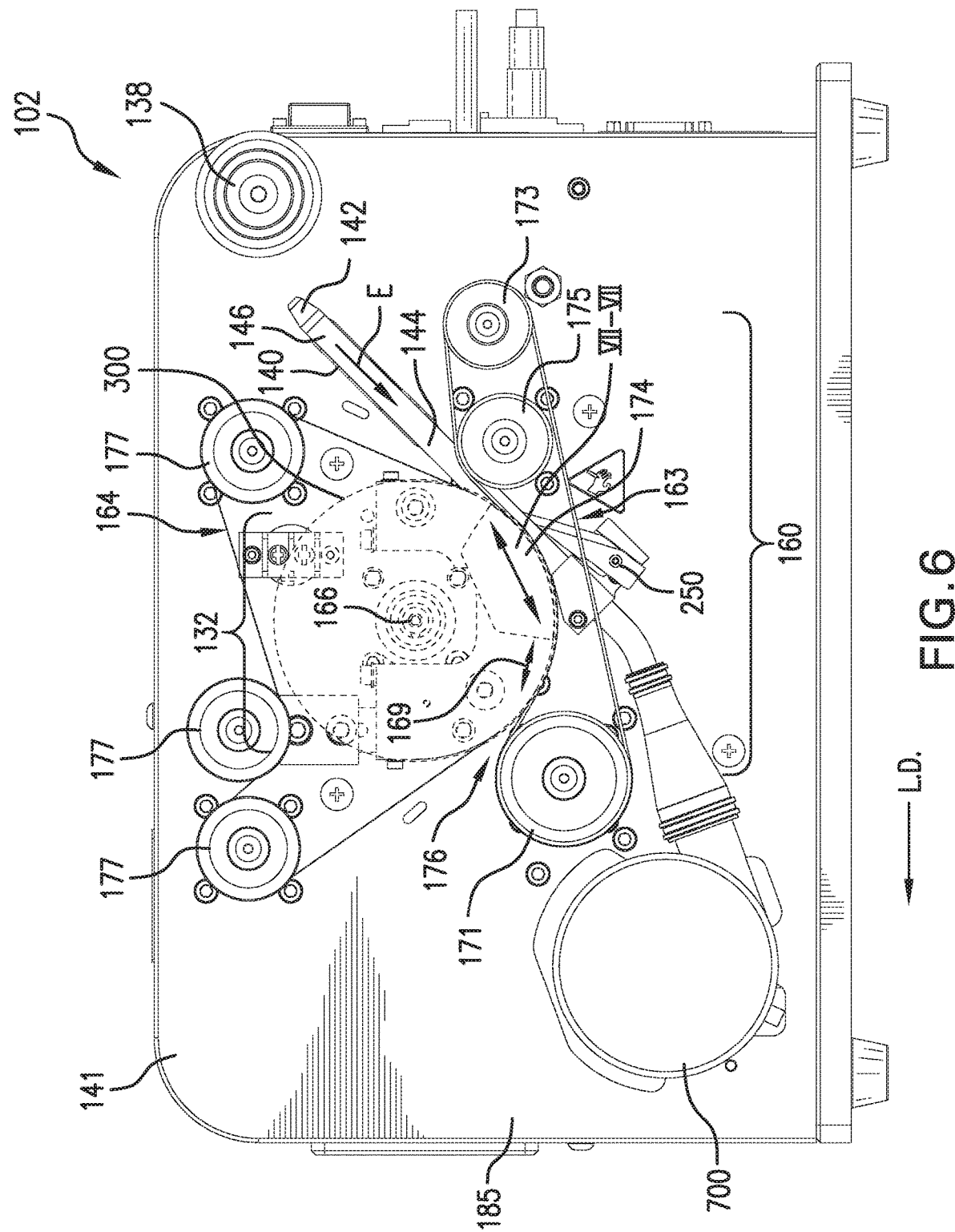
Figure 7:
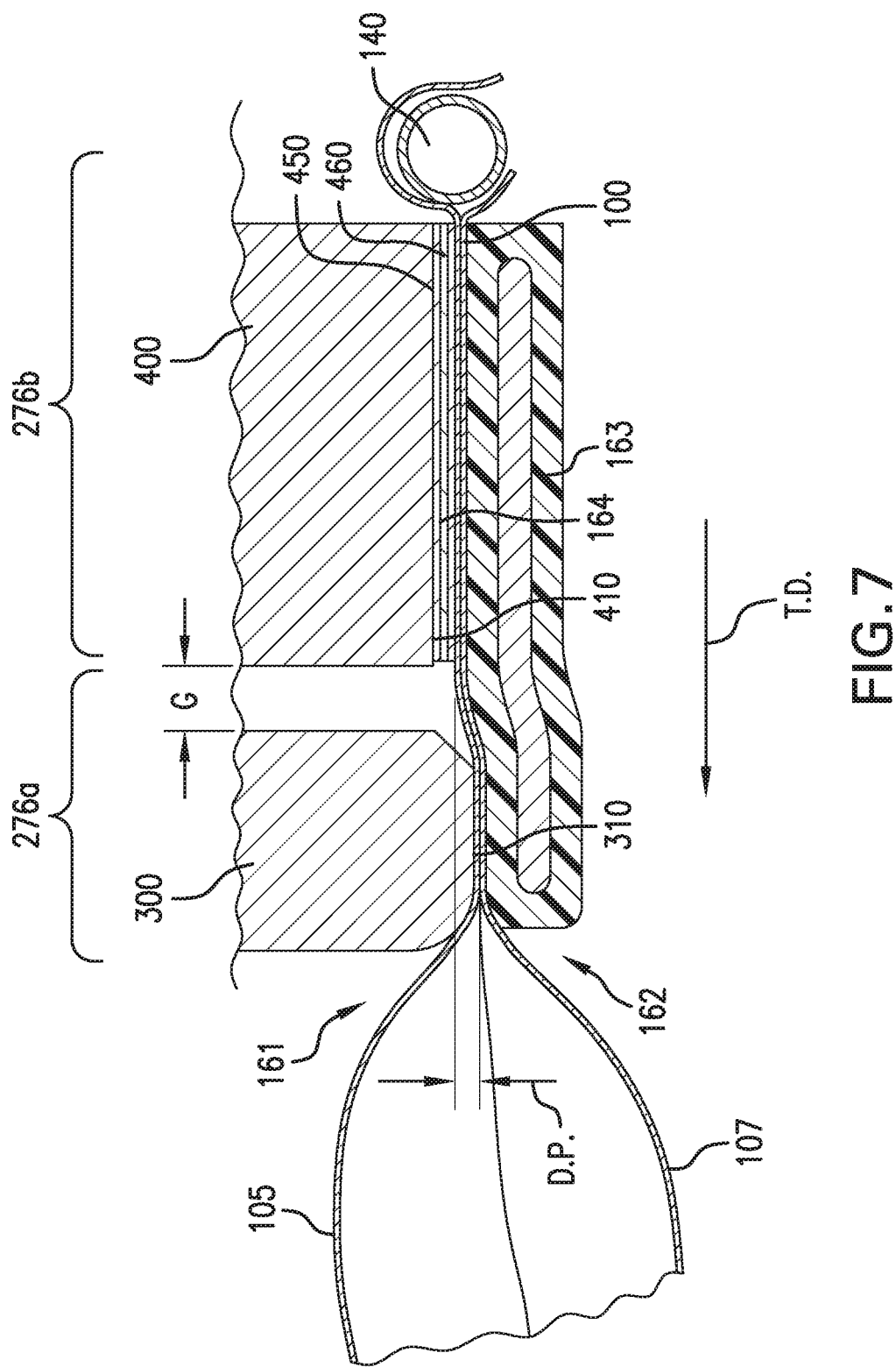
FIG. 7 is a cross-sectional view taken along section VI-VI show in FIG. 6.

FIGS. 3, 6 and 7 illustrate a side views of the inflation and sealing assembly 132. As shown in FIG. 3, the fluid source can be disposed behind a cover 184 or other structural support for the nozzle and sealing assemblies including a housing plate 185 on which the cover 184 mounts. The cover 184 includes a sealing and inflation assembly opening 184a as shown in FIG. 3. The fluid source (e.g. from blower 700) is connected to and feeds the fluid inflation nozzle conduit. The web material 100 is fed over the inflation nozzle 140, which directs the web to the inflation and sealing assembly 132.

While various examples are described herein and shown in the FIGS. 2-7, it should be appreciated that these examples should not be limiting and that the nozzle 140 and inflation assembly may be configured in accordance with any known embodiments or developed embodiments that may benefit from the disclosure herein as a person of ordinary skill in the art could apply based on the disclosure herein.

Preferably, the web material 100 is continuously advanced through the sealing assembly along the material path "E" and past the heating assembly 400 at a pinch area 176 to form a continuous longitudinal seal 170 along the web material 100 by sealing the first and second plies 105,107 together. The longitudinal seal 170 is shown as the phantom line in FIG. 1. Preferably, the longitudinal seal 170 is disposed a transverse distance from the first longitudinal edge 102,106, and most preferably the longitudinal seal 170 is disposed along the mouths 125 of each of the chambers 120.

The web material 100 is advanced or driven through the inflation and sealing assembly 132 by a drive mechanism 160. The inflation and sealing assembly 132 may incorporate the drive mechanism or the two systems may operate independently. The drive mechanism 160 includes one or more devices operable to motivate the flexible structure through the system. For example, the drive mechanism includes one or more motor driven rollers operable to drive the flexible material 100 in a downstream direction along a material path "E", such as those disclosed in US2017/0282479. One or more of the rollers or drums are connected to the drive motor such that the one or more rollers drive the system. In accordance with various embodiments, the drive mechanism 160 drives the web material 100 without a belt contacting the flexible structure or in some embodiments, the entire system is beltless. In another example, the system has a belt that does not contact the web material 100 but instead drives the rollers. In another example, the system has a belt on some drive elements but not others, such as those disclosed in US2015/0239196 In other example, the system may have belts interwoven throughout the rollers allowing the material to be driven through the system by the belts. For example, U.S. Pat. No. 8,128,770 discloses a system that utilizes belts and rollers to control the inflation and sealing of cushions 121 and the disclosure provided herein may be utilized with such a system.

In accordance with various embodiments, the drive mechanism 160 includes opposing compression mechanisms 161 and 162. As illustrated in FIG. 6, the compression mechanism 161 is positioned adjacent to the compression mechanism 162. The compression mechanism 161 is positioned relative to the compression mechanism 162 such that the two compression mechanisms 161, 162 together are operable to receiving the flexible material 100 at a pinch area 176. The pinch area 176 is defined by the area in which the compression mechanism 161 and the compression mechanism 162 are positioned against the web material 100 to pinch the web material 100 there between. The pinch area 176 can extend from A to B shown in FIG. 6.

The drive mechanism 160 can also include other compression mechanisms. The other compression mechanisms would also positioned adjacent to the compression mechanism 162 or the compression mechanism 161. The relationship between the other compression mechanisms and the compression mechanism 162 or 161 can be such that the two compression mechanisms form a second pinch area or extend the pinch area 176 in which the compression mechanisms contact and apply pressure to the web material 100.

In accordance with various embodiments, the drive system forms a cooling zone 169 that is disposed contemporaneously with or downstream of the pinch area 176. In accordance with a particular example as shown in FIG. 6, the pinch area 176 includes a heating zone 167 and a cooling zone 169. The cooling zone 169 is defined at least partially between compression mechanism 162 and 161 within the pinch area 176. The compression mechanism 162 and/or the compression mechanism 161 forms a path from point A to point B of the pinch zone and at least a portion of this path allows for cooling the newly formed longitudinal seal 112 on the flexible material 100 while still under pressure from the compression mechanisms within the pinch area 176. The longitudinal seal 112 is formed by a heating assembly 400 that is a part of sealing assembly 132.

The peripheral area the curved surface 162*a* along the compression mechanism 162 forms a contact area that engages the flexible material directly. As discussed in more detail below, in some embodiments, the peripheral area is cylindrical and accordingly the peripheral area is the outer circumferential area of the cylinder. In other embodiments, the peripheral area is the outer area of the surface of the shape defining the compression mechanism 162. Absent the holding pressure caused by the pinch area 176 against the cooling zone, the effectiveness of the longitudinal seal 112 would be reduced due to the air pressure within the inflated chamber. In accordance with various embodiments, the cooling zone is sufficiently long to allow sufficient cooling of the longitudinal seal 112 to set in the seal such that the air pressure within the inflated chamber 120 does not stretch or deform the longitudinal seal 112 beyond the longitudinal seal's 112 ability to hold the air pressure therein. If the cooling zone is not sufficiently long such the longitudinal seal does not properly set.

The pinch area can have any suitable shape. For example, the pinch area may be substantially rectilinear (e.g. 176' in FIG. 9). In a preferred example, the pinch area 176 is arcuate. Regardless of the shape, the pinch area can be made up of rollers, belts, or other suitable drive mechanisms. As shown in the FIGS. 2-7, the pinch zone is defined by a combination of belts and disks.

If the pinch zone is arcuate, and the angle between the pinch points A and B is too large, the inflated material could wrap back on itself. Thus the location of the pinch point A and B relative to one another around the curved surface path 162*a* is preferably one that produces the best seal without allowing the flexible material to interfere with itself thereby providing a superior with longitudinal seals 112 that adequately hold the air. In accordance with various embodiments, the pinch point A is located at an angle that is greater than 15° from the pinch point B as measured around axis 161*a*. In accordance with various embodiments, the pinch point A is located at an angle that is less than 180 from the pinch point B as measured around axis 161*a*. In accordance with various embodiments, the pinch point A is located at an angle that is between than 85° and 145° from the pinch point B as measured around axis 161*a*. In accordance with various embodiments, the pinch point A is located at an angle that is between than 105° and 125° from the pinch point B as measured around axis 161*a*. In accordance with various embodiments, the pinch point A is located at an angle that is about 115° from the pinch point B as measured around axis 161*a*. In each of the above embodiments and examples, it should be appreciated that the pinch points A and B are defined by the positions and/or shapes of the compression mechanisms 161 and 162 relative to each other.

In accordance with various embodiments, the compression mechanisms can include adjustment mechanisms, biasing mechanisms or other suitable devices for controller their relationship between one another or the pressures between one another.

In accordance with a preferred embodiment, the drive mechanism 160 comprises opposing drive systems. In various examples, the opposing drive systems form part of or all of the compression mechanisms 161 and 162. In various examples, as illustrated in FIGS. 4-7, one portion of the drive mechanism can include a driven belt 163. In various examples, one portion of the drive mechanism can include a transport belt 164. The transport belt may be driven or alternatively may be a passive idler feature driven merely by the web material 100 or another driven feature of the system. One portion of the drive mechanism can include a secondary surface 310 corresponding to one belt surface. One portion of the drive mechanism can include a guide surface 410 corresponding to another belt surface, roller surface, or stationary surface.

In accordance with various embodiments, the drive mechanism 160 includes the compression mechanism 162. The compression mechanism 162 includes driven belt 163. In some embodiments, belt 163 can define a portion of the web 134 path that is flat/rectilinear. In other embodiments, the belt 163 defines a portion of the web 134 path that is arcuate. The belt 163 pulls or pushes or otherwise transports the web 134 through the pinch area 176 and holds the web 134 sufficiently tight along the path of the pinch area 176 (either flat or arcuate) to retain the fluid within the chamber 120 as the longitudinal seal 112 is applied and then cools. Holding the longitudinal seal 112 tightly closed in the cooling zone 169 via belt 163 limits the stretching and deformation against the seal 112 caused by the air pressure within the inflated chamber 120.

The drive mechanism 160 may drive the web 134 adjacent to the heating assembly 400 such that the heat seal 112 is continuously created as the web 134 is driven in a downstream direction. In one example, the drive mechanism 160 may tension the web 134 against the heating assembly 400, via one or more compression elements, to create the longitudinal seal 112. More particularly, the belt 163 may be tensioned, as described below, to create a compression force pinching at least a portion of the web 134 against the heating assembly 400.

In accordance with various embodiments, the belt 163, which may be referred to as an elastic belt, a first belt, or a second belt, includes many configurations. For example, the belt 163 may include a composition suitable for transporting the web 134 through the pinch area 176. The belt 163 can have a high grip surface, such as a high tackiness and/or friction material on a surface of the belt 163 (e.g., a tacky exterior surface). The high grip surface of the belt 163 may be defined as part of the belt 163 itself, such as integrally formed with the belt 163. The high grip surface of the belt 163 may be resultant from the properties of the material from which the belt 163 is formed. In some examples, the high grip surface of the belt 163 may be achieved by application of a substance or material onto the belt 163. For instance, a tacky substance or material may be coated, sprayed, or otherwise applied to the belt 163. In some examples, material may be coated, sprayed, or otherwise applied to the belt 163 to increase the friction between the belt 163 and the web 134. In some examples, the high grip surface may be achieved by selective heating of at least a portion of the belt 163. For example, the belt 163 may be formed from a material such that heating of the belt increases the tackiness and/or friction of the belt 163. As described herein, a tacky material is one that is somewhat sticky, grippy, or grabby such that the belt 163 grips the web 134 with a relatively small force against the web 134.

The belt can include an outer portion and an inner portion. The inner portion can include a reinforcement core, such as a Kevlar core. The core of the belt 163 may provide a desired structural characteristic. For example, the core may limit flexing or stretching of the belt, whether radially, longitudinally, or transversely, during operation. The belt 163 may be wider than the heating assembly 400. The belt 163 may include a main surface, a bottom surface opposing the main surface, and a pair of opposing side surfaces extending between the main surface and the bottom surface. The belt 163 may bias the web 134 towards the heating assembly 400. For example, the web 134 may be positioned between the belt 163 and the heating assembly 400 such that the belt 163 pinches at least a portion of the web 134 against the heating assembly 400. In one example, the belt 163 may be positioned such that the main surface pinches the web 134 against the heating assembly 400.

In one example, the outer portion of the belt 163 may facilitate transporting the web 134 through the pinch area 176. For instance, the outer portion of the belt 163 may include a high grip characteristic. For instance, the belt 163 may include a high tackiness and/or a high friction material on a surface thereof that contacts the web 134 to grip the web 134 during heating by the heating assembly 400. Without the high grip characteristic of the belt 163, the web 134 may move (e.g., slip or slide) relative to the belt 163 without the belt 163 being significantly tensioned against the web 134. The tackiness and/or friction characteristic of the belt 163 may facilitate the belt 163 gripping or grabbing the web 134 with less compressive force against the web 134. As such, the tension of the belt 163 needed to drive the web 134 in a downstream direction through the pinch area 176 may be significantly reduced due to the high tackiness and/or friction characteristic of the belt 163. In one example, the effective compression force of the belt 163 through the pinch area 176 may be between a minimum of 15 lb., 20 lb., or 25 lb. and a maximum of 30 lb., 35 lb., or 40 lb., such as between 25 lb. and 30 lb. In some designs not utilizing a high tackiness and/or a high friction belt, the effective compression force through the pinch area can be significantly higher, such as between two to four times higher.

The high grip characteristic of the belt 163 may be defined by a material of the belt 163. For example, the belt 163 may be formed at least partially from an elastomeric material. In one example, the tacky exterior surface is defined by an elastomeric material. In one example, the outer portion of the belt 163 may be formed at least partially from an elastomeric material. The elastomeric material may be a synthetic material, a natural material, or a combination of synthetic and natural materials. Depending on the particular application, the elastomeric material may be a saturated rubber, such as silicone, EPM, and/or EPDM rubber. The elastomeric material may be an unsaturated rubber, such as natural, butyl, styrene-butadiene, and/or nitrile rubber. The elastomeric material may be a thermoplastic elastomer, a thermoplastic polyurethane, a thermoplastic olefin, and/or a thermoplastic vulcanizate. In one example, the belt 163 may be formed at least partially from a low durometer rubber or silicone. In some examples, the belt 163 may be textured and/or shaped to include a high grip surface. For example, the belt 163 may include a high surface roughness. In some examples, the belt 163 may be ribbed or otherwise configured to increase friction between the belt 163 and the web 134.

In some examples, the belt 163 may be resiliently or elastically stretchable. For example, the belt 163 may be formed at least partially from generally elastic material, such as rubber or silicone. In such examples, the belt 163 may stretch or elastically deform around adjacent structure in driving the web 134 through the pinch area 176, as explained below. The stretchable characteristic of the belt 163 may be in conjunction with or as an alternative to the high grip characteristic described above. More particularly, the belt 163 may include a high grip characteristic, a stretchable characteristic, or a high grip and stretchable characteristic.

The belt 164 may be configured as described above, whether in conjunction with belt 163 or not. For example, the belt 164, which may be referred to as a first belt or a second belt, may have a high tackiness characteristic, such as being formed from a high tackiness material. In this manner, either the belt 163, the belt 164, or both the belt 163 and the belt 164 may have a configuration suitable for transporting the web 134 through the pinch area 176. As described more fully below, the web 134 may be positioned between the belt 163 and the belt 164. In such examples, the drive mechanism 160 may include a high tackiness belt on either side of the web 134 to facilitate movement of the web 134 through the pinch area 176 with a lower effective compression force therethrough. In some examples, the belt 164 may be formed from a material different than the belt 163. For instance, the belt 164 may be less tacky than the belt 163. In one example, the belt 164 is formed at least partially from polytetrafluoroethylene, or other similar material.

In accordance with various embodiments, as illustrated in FIGS. 2-7, belts 163 and 164 oppose one another. Belts 163 and 164 are configured relative within the pinch area 176 and receive the web 134 therein. More specifically, in the embodiments shown, the belt 163 compresses against the web-support surface 410 defining the pinch zone, which overlaps longitudinally with the heating zone 167. In various embodiments, the pinch zone 176 includes a plurality of pressure regions transverse to one another. For example, the pinch zone 176 can include a first region 276a and a second region 276b. In some embodiments, the plurality of pressure regions can apply different forces on the web material 100. In other embodiments, the pressure regions apply similar forces in different manners. In one example, a compression element (e.g. belt 163) presses against two different opposing pressure elements (e.g. disc 300 and heater assembly 400). In this way the opposing pressure elements can apply pressure to the compression element in different ways creating two different pressure regions (e.g. the first pressure region 276a and the second pressure region 276b). In instances of different pressure forces in these regions the compression element (e.g. belt 163) can deflect or deform to accommodate the different pressures. The deflection distance D.P. can be from about 5 mils to 50 mils. The outer pressure can be considered an isolation pressure as it is able to aid in isolating the fluid in the air chambers 20. In embodiments where the forces are different in each of the regions 276a and 276b, the differences can be caused for example, by a narrower region to pass the web material through with respect to the other region. In another example, the region sizes are similar but the opposing compression elements have different materials. As such, the web material will deflect one material more and as a result one material will apply a higher pressure than the other. In other embodiments, the different regions merely have pressure coming from different directions, or locations, or as illustrated in the example of FIG. 7 the isolation element 300 actually extends into the compression element (e.g. belt 163) whereas the support structure 405 does not. In a preferred embodiment, the isolation element 300 is a continuous surface that substantially matches the profile of the device forming the adjacent region. For example, the support surface 410 is curved similarly to the isolation surface 410. In other embodiments, the isolation element 300 has a discontinuous surface 310. For example, the isolation element 300 can be a wheel that has fingers that contact the martial and sufficient intervals to limit fluid passage or otherwise stabilize the web material 100.

In accordance with various embodiments, the isolation element 300 is configured to block or resist the flow of fluid from the inflatable chambers 120 back toward the nozzle. Additionally or alternatively, the isolation element 300 is configured to isolate the portion of the web material 100 that is being sealed from the movement of the portion of the web material 100 that extends transversely from the system. Either one or both of these results can be accomplished by an increased pressure applied to the web martial transversely of the sealing region, or by applying a complex bend or curve to the web material 100 as it passes through the sealing mechanism. In accordance with various embodiments, the isolation element 300 can remain in contact with the web material 100 through both the cooling and heating zones of the sealing mechanism. As discussed herein, the isolation element 300 and/or the surface 310 is transversely offset from support structure 405 or other compression mechanism used to define the pinch zone. Preferably, the isolation element 300 and the support structure 405 are longitudinally aligned. The transverse offset is sufficiently small to allow the isolation element 300 to bock or resist the flow of fluid between the chambers 120 and the nozzle. In one example, the offset G (see FIG. 7) is less than the thickness of the belt 163. In another example, the offset is less than ½ the thickness of the isolation elements transverse thickness.

In accordance with one example as shown in FIG. 7, the compression mechanism 161 includes an isolation element 300 having a surface, 164. For example, the belt 163 may bias the web 134 against the isolation surface 310 of the isolation element 300. In such examples, the web 134 may be biased against the secondary surface 310 to seal the fluid within the chamber 120 as the longitudinal seal 112 is created. As described below, the isolation element 300 may deflect a portion of the belt 163 in a direction generally normal to the main surface of the belt 163, such as upwardly or downwardly. In such examples, the belt 163 may flex to accommodate the deflection caused by the isolation element 300. For instance, the belt 163 may flex radially to accommodate the deflection of the isolation element 300.

The isolation surface 310, which may be referred to as an isolation surface or a second sealing surface or secondary surface, may be adjacent to the guide surface 410. In one example, the secondary surface 310 can be generally aligned with the surface 410 in the longitudinal direction L.D. In accordance with various embodiments, the isolation surface 310 is located in front of, behind, or both in the transverse direction relative to the surface 410.

The secondary surface 310 may be stationary, flat or rectilinear, arcuate, or any combination thereof. In some embodiments, the isolation element 300 may be rotating disc. Preferably, the belt 164 and the isolation surface 310 are offset longitudinally from one another. However, in alternative embodiments, they can overlap as well with the belt 164 extending under the isolation surface 310. The isolation surface 310 and the support surface 410 do not necessarily contact the opposing compression mechanism at the same level. Alternatively, the isolation surface 310 and the support surface 410 can have perpendicular offsets relative to one another allowing on or the other to extend farther into or towards the opposing compression mechanism (e.g. belt 163). As used herein the perpendicular direction of the offset is the direction perpendicular to the major surface of the web material as it moves through the system. Even when accounting for intermediate components (e.g. belt 164, heating element 450, low friction intermediary 460, etc., discussed in more detail below), the isolation surface 310 can extend farther into or towards the belt 163 than surface 410 with the intermediate components defining a disk pressure offset D.P. FIG. 7 illustrates the disk pressure offset D.P. The disk pressure offset D.P. is about 0.020 inches. In some embodiments, the surface 310 is stationary. In some examples, the surface offset D.P. may be equal to the material thickness of the web 134, greater than the material thickness of the web 134, or less than the material thickness of the web 134. In these and other examples, the belt 163 may flex radially to accommodate the surface offset D.P. between the surfaces 310 and 410. In embodiments where the belt 163 is resiliently or elastically stretchable, the belt 163 may resiliently or elastically stretch to conform to the surfaces 310 and 410. For instance, the belt 163 may deform elastically around the surfaces 310 and 410 to accommodate the surface offset D.P. between the surfaces 310, 410. In such examples, the belt 163 may resiliently stretch in a direction normal to the main surface of the belt 163 to accommodate the surface offset D.P.

The belt 163 may create respective compression forces pinching at least portions of the web 134 against the surfaces 310 and 410. In such examples, the compression forces of the belt 163 at the surfaces 310 and 410 may be different. For instance, the compression force of the belt 163 against the surface 410 may be lower than the compression force of the belt 163 against the surface 310. In such examples, the surface offset D.P. may create the different compression forces of the belt 163 against the surfaces 310 and 410. The compression forces may be sufficient to achieve a desired functional characteristic. For example, the compression forces may be low but sufficient to permit the belt 163 to drive the web 134 through the pinch area 176. Additionally, the compression force of the belt 163 against the surface 310 may be sufficient to limit air leakage from the chamber 120 while the seal 112 is created adjacent to surface 410. More particularly, the compression force of the belt 163 against the surface 310 may be sufficient to substantially isolate the pressure inside the chamber 120 from the heat seal area adjacent to surface 410.

In other embodiments, the surface 310 forms a part of a rotating disc 300. In such embodiments, as the web material moves through the sealing assembly, the web material rotates the disc. In other embodiments, the drive system rotates the disc.

Figure 9A:
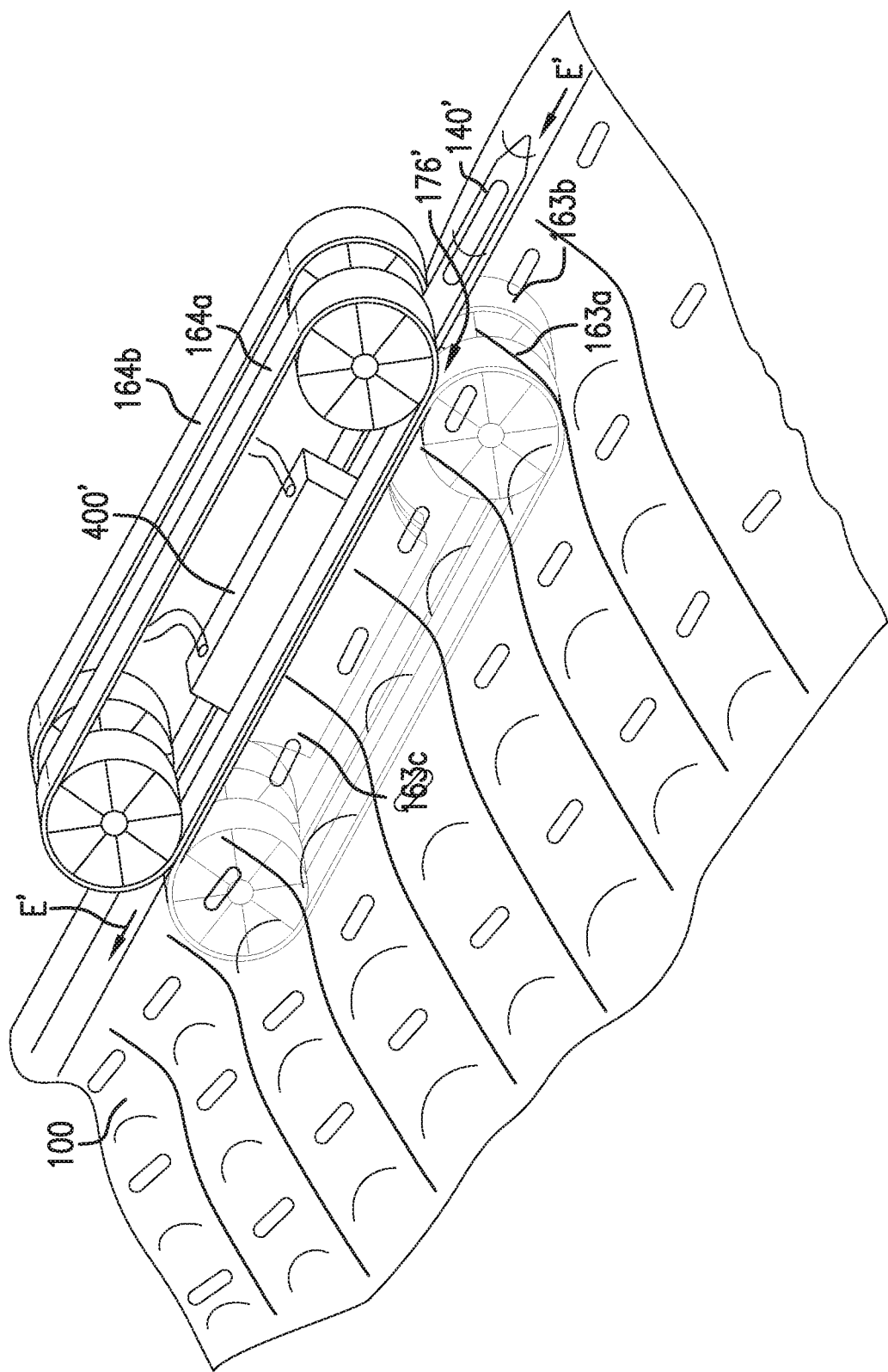
FIGS. 9A and 9B are a rear perspective view and a proximal-side view, respectively, thereof of another embodiment of the heating and sealing assembly.
Figure 9B:
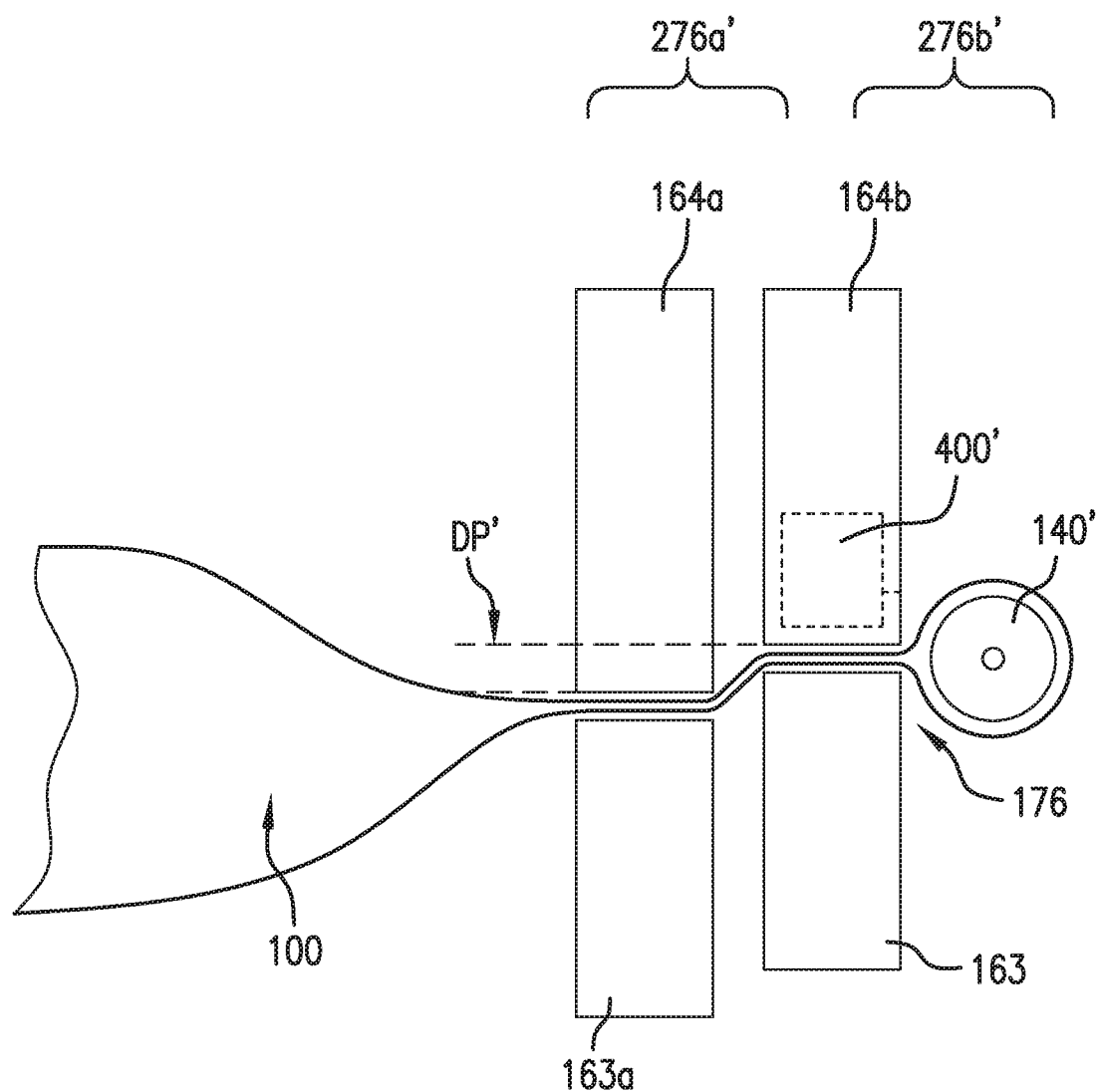

FIGS. 9A and 9B illustrate an alternate embodiment having a flat pinch zone 176', in the embodiment upper (164a/b) and lower (e.g. 163a/b) compression element apply pressure to the web material 100 at different levels deflecting the material laterally. For example, belts 163a and 163b are offset in in the perpendicular direction relative to one another a distance of D.P.'. The pressures are offset relative to one another a distance of D.P due to the different opposing compression elements applying pressure at different levels. In this way a linear pinch zone 176' also establishes different pressure regions 276a' and regions 276b'. Internal structures such and support 163c and/or heating assembly 400' can also be position or biased to provide or resist pressure from the other elements.

Figure 9C:
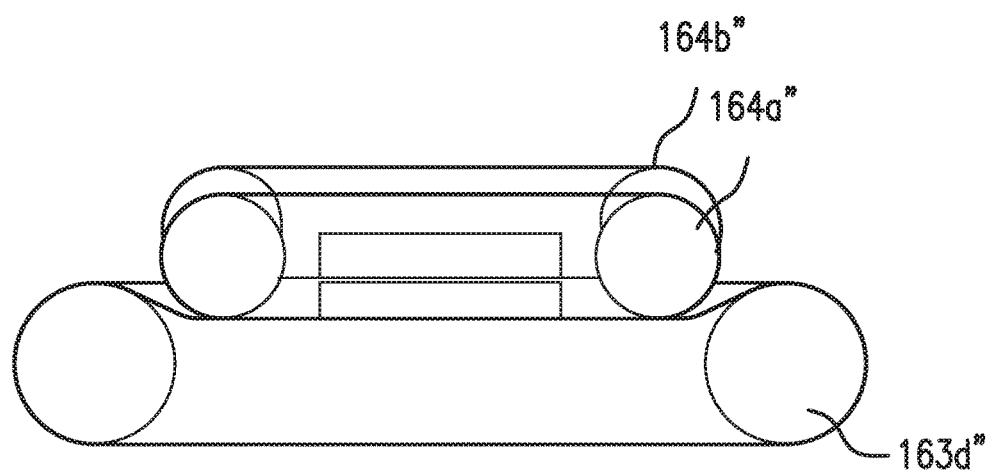
FIGS. 9C and 9D are a rear view and a proximal-side view, respectively, thereof of another embodiment of the heating and sealing assembly.
Figure 9D:
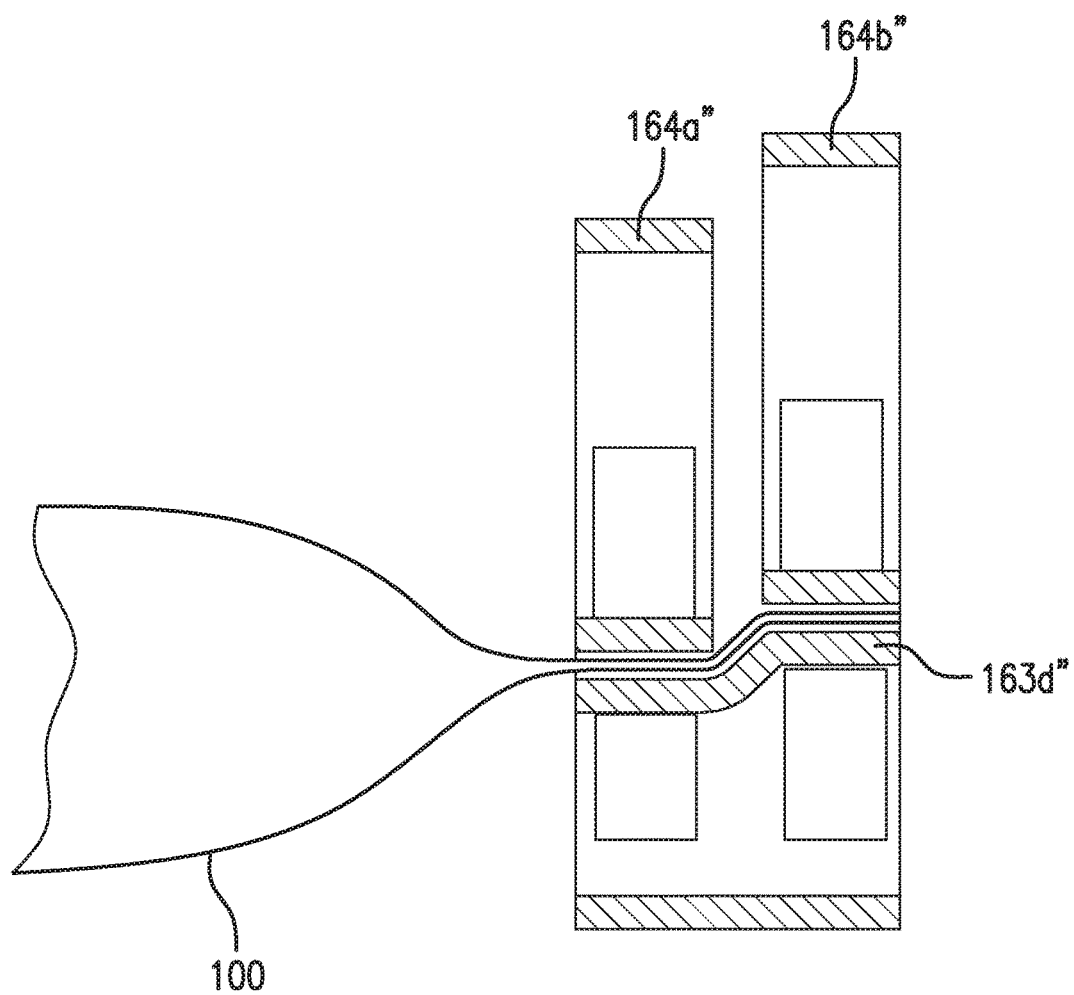

FIGS. 9C and 9D illustrate an alternate embodiment having a flat pinch zone 176", in the embodiment the upper (164a/b") and the lower single (e.g. 163d") compression element apply pressure to the web material 100 at different levels deflecting the material laterally and the lower compression element laterally. The opposing compression elements 164a" or 164b" with 163d" form the opposing pressure causing the offset D.P. In this way a linear pinch zone 176" also establishes different pressure regions 276a" and regions 276b". This is shown as an example with a single lower belt that is also deflected D.P. The deflection can help isolate fluid out of the nozzle and away from the forming seal.

In accordance with various embodiments, the drive mechanism 160 includes the compression mechanism 161. The compression mechanism 161 can include belt 164. In accordance with various embodiments, the compression mechanism 161 includes guide surface 410. In accordance with various embodiments, the guide surface 410, which may be adjacent to the heating assembly 400 and which may be referred to as a first sealing surface, may set at least a portion of the belt path of the belt 163 and/or the belt 164. For example, the belt 163 and/or the belt 164 may wrap around the guide surface 410. In some examples, the guide surface 410 may protrude into a line between adjacent belt supports to form a bent belt path. In some embodiments, the guide surface may be movable, e.g. being the surface around an idler or drive pulley. As illustrated in FIGS. 7-8, the guide surface 410 is stationary. As seen from a side view of the drive mechanism (i.e. transversely across the web), the guide surface can be flat/rectilinear (see e.g. FIGS. 9A and 9B) or the guide surface can be arcuate (see e.g. FIG. 6). In one example, as illustrated in FIGS. 8A-8E the guide surface is arcuate and sets at least a portion of the path of the drive mechanism (e.g. belt 164) in an arc as shown by example in FIG. 6. Additionally or alternatively, the drive mechanism (e.g. belts 163 and 164) forms a part of the compression mechanism and pulls against or otherwise places a compressive pressure against an opposing surface (e.g. the web-support surface 410), where one or more of the compression mechanisms are sufficiently stationary to provide an opposing force. In this manner the opposing surface (e.g. web support surface 410) defines a portion of the path for both belts 163 and 164. This portion of the path is the pinch area 176. In such examples, belts 163 and 164 may be biased against the guide surface 410 to pinch the plies of web 134 together. In a preferred embodiment, the guide surface 410 is at least partially circular and/or circular through the pinch zone 176.

To elaborate on the particular example shown in FIGS. 2-7, the drive mechanism 160 can include a compression belt 163 and a transport belt 164. The compression belt 163 wraps around a drive pulley (e.g. 171) and one or more idler pulleys (e.g. 173). Any of the pulleys can include a tensioning mechanism for locating or tensioning the compression belt 163. The drive mechanism 160 may also include an idler pulley (e.g. 175) position to wrap the compression belt around an opposing compression element. As shown in this example the opposing compression element is the heating assembly 400. The heating assembly 400 includes the support structure 405 which defines the support surface 410. The pulleys are positioned to cause the compression belt 163 to wrap around and exert a pressure on the support surface 410. This interaction defines the pinch zone 176. The drive mechanism can also include a transport belt 164 which is also wrapped around the support surface 410. Pulleys 177 can support, guide, and position the transport belt around the support surface 410. Any of the pulleys can include a tensioning mechanism for locating or tensioning the transport belt 164.

In accordance with various embodiments, the transport belt can be a low friction material especially in comparison to the compression belt 163. In a preferred embodiment, the transport belt 164 is a Teflon belt. In a preferred embodiment, the transport belt is about 5-50 mils thick.

Of note, and to reiterate the description above, the drive mechanism can be any suitable system including belts, rollers, or other suitable transportation devices. The embodiments illustrated in FIGS. 2-7 and described herein, are merely examples of one type of suitable system, the system using opposing belts that and a pressure disc. A person of ordinary skill in the art will understand in light of the disclosure herein that the concepts discussed with respect to the belts or the disks may be applied to other systems utilizing rollers or other web transportation devices.

In accordance with various embodiments, the inflation and sealing device 102 may include one or more covers (e.g. 182 and 184) over the inflation and sealing assembly 132. The covers (e.g. 182 and 184) can be operable to redirect the web after the web exits the pinch area 176 at point B. For example, the covers include a deflection surfaces 182a and/or 184a that contacts the flexible material 100 as it exists at point B and aids in separating the flexible material 100 from the compression mechanisms 161 and 162 redirecting the web material 100 in any desired direction. The cover may be a harder material than the rollers and sufficiently smooth and continuous to have relatively little engagement or adhering tendency with the web material 100.

In each of these various systems for drive mechanisms referred to above, the sealing assembly 132 also includes a heating assembly 400 operable to seal the different layers of the web material 100 to one another.

In accordance with a preferred embodiment, the heating assembly 400 is stationary. Examples of various heating assemblies and heating elements positioned stationary while the flexible material 100 and the drive mechanisms move relative to the heating assemblies and heating elements are depicted in FIGS. 8A-8E. By positioning the heating assembly 400 so that the heating assembly 400 remains stationary while the flexible web material 100 moves across the heating assembly 400, the entire seal is formed by the same section of heating assembly allowing for greater consistency in heating assembly temperature, positioning, and overall conditions, which in turn provides for consistent seals. The stationary position of the heating assembly 400 also allows for simplified construction of certain heating elements and or heating element tensioning mechanisms, which further improves the consistent application of the seals.

In accordance with various embodiments, the heating assembly 400 can define at least a portion of the path E. In more particular embodiments, the heating assembly 400 can define a portion the pinch zone 176 along path E. As discussed above, this portion of the path E can be rectilinear or curved. FIG. 9 illustrates an example of a rectilinear path. Whereas the FIGS. 2-8 illustrate an example of a curvilinear path. In either embodiment, the heating assembly 400 can support the heating element 450. This may be done directly or indirectly. For example, a belt mounted over the heating assembly 400 may be used to direct heat to the web-material 100. In other examples, a separate heating element 450 may be mounted directly to the heating support structure 405. In such an example, other covers shield, belts, or suitable protective devices can separate the heating element 450 from the web-material 100. For example, protection element 460 can cover the heating element 450 protecting it from the transport belt or other moving feature of the system (e.g. film, compression element, roller, etc.).

In one example, the heating assembly 400 is attached to or otherwise extends from the cover 185. As discussed above, the heating assembly 400 is positioned adjacent to one or more drive members and relative to the compression mechanism 162 or 163. In a more particular example, the heating assembly, when viewed from the side as shown in FIG. 7B, the heating assembly is mounted and defines surface 410 that sets at least a portion of the curvature of belts 163 and 164. In accordance with various embodiments, the heating assembly 400 includes a first conductive support 402, a second conductive support 404, an insulative support 406, and a heating element 450. The first conductive support 402, second conductive support 404, insulative support 406 are connected together and define the web-support surface 410. In various examples, the heating element 450 is oriented along surface 410. Preferably, the heating element is longitudinally straight with both narrow and wide portions receiving pressure in the pinch zone 176.

In accordance with various embodiments, the heating element 450 is electrically connected to both conductive supports 402/404. The heating element is laid across and supported by the conductive and insulative support 406. The portion of the heating element 450 that is laid across and supported by the conductive and insulative support 406 defines, at least in part, a portion or all of the heating zone 167. In this embodiment, the insulative support 406 electrically separates the conductive supports 402/404. Alternatively or additionally the insulative support 406 can be thermally insulating. With thermally insulating properties, the insulative support 406 can help control the temperature differential between the cooling zones and the heating zones, thereby improving the seal quality and/or efficiency.

In accordance with various embodiments discussed herein, the heating element 450 may include a high heat region 454 that has relatively high temperature compared to the remaining extent of the heating element 450. The heat zone 454 of heating element 450 corresponds to the heating zone 167. The high heat region 454 is offset to the upstream end of the surface 410. The upstream end of the web-support surface 410 also corresponds to the upstream end of the pinch zone 176. By offsetting the heating zone 167 to the upstream end of the pinch zone 176, the pinch zone 176 can be utilized to apply pressure to the web material 100 during both the heating portion of the process and the initial cooling process. In some embodiments, the heating element 450 can have different sections of different heat levels that extend throughout various regions along the material path of the pinch zone 176. In this way, the temperature of the web material 100 can be controlled after the seal is formed in the heating zone 167, while still applying pressure via the pinch zone 176.

In accordance with various embodiments, the heating element 450 extends the entire length of the pinch zone 176. Preferably, the heating element 450 is longer than the pinch zone 176 but in some examples can be shorter. Within the pinch zone 176 there is a heating zone 167 and a cooling zone 169 after the heating zone. In various examples, the heat zone is between about ¼ and ½ the length of the heating element. Preferably the heat zone is about ¼ the length of the heating element. In various examples, heat zone is between about ½ and ¾ the length of the pinch zone. Preferably, the heat zone is about ⅔ the length of the pinch zone. The cooling zone is between about ¼ and ½ the length of the pinch zone. Preferably, the cooling zone is about ⅓ the length of the pinch zone 176.

In various embodiments, the heating assembly 400 is positioned transversely between the nozzle 140 and the chambers 120 being inflated to seal across each of the transverse seals. Some embodiment can have a central inflation channel, in which case a second sealing assembly and inflation outlet may be provided on the opposite side of the nozzle. Other known placement of the web and lateral positioning of the inflation nozzle and sealing assembly can also be used.

Figure 5:
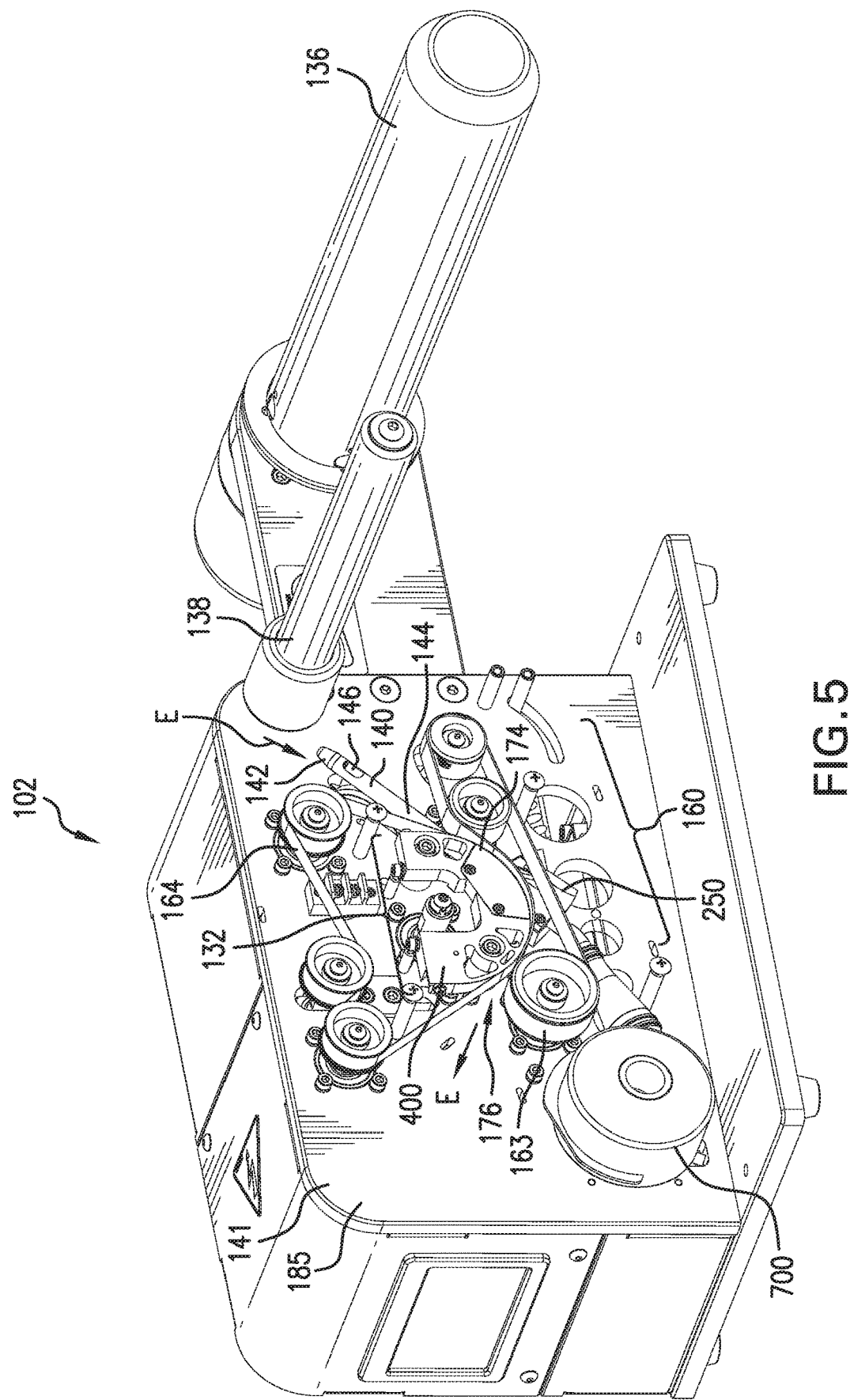
FIGS. 5 and 6 are a front perspective view and a proximal-side view, respectively, thereof with the covers removed.

After inflation, the web material 100 is advanced along the material path "E" towards the pinch area 176 where it enters the sealing assembly 103. In one example, the pinch area 176 is disposed between adjacent compression mechanisms 161 and 162. The pinch area 176 is the region in which the first and second plies 105,107 are pressed together or pinched to prevent fluid from escaping the chambers 120 and to facilitate sealing by the heating assembly 400. As illustrated in FIG. 5, the pinch area 176 may include a pinch region between the compression mechanism 162 and the heating assembly 400. The pressure produced in this pinch area between compression mechanism 162 and the heating assembly 400 helps form the seal. As indicated above, the heating assembly 400 can be stationary. Thus, in such embodiments, the pinch area 176 between the compression mechanism 162 and the heating assembly 400 includes a moving element, e.g. the compression mechanism 162 and a substantially stationary element, e.g. heating assembly 400. In accordance with various embodiments, the drive mechanism 160 rollers 161 and 162 can be compressed against one another for driving the flexible material 100 through the system and the rollers 161 and 162 can open for threading the flexible material 100 over the drive mechanism 160. Similarly, the open state of the drive mechanism 160 also allows threading the flexible material 100 between the heating sealing assembly 400 and the opposing roller 162 as shown in FIG. 5.

The heating assembly 400 includes a heating element 450 disposed adjacent to the pinch location to heat the pinch area 176. While in the various embodiments disclosed herein the compression mechanisms adjacent to the pinch area 176 can roll, the heating element assembly 400 is a stationary heating element. As indicated above, the pinch area 176 is the area where the compression mechanisms 161 and 162 are in contact with each other or with the web material 100 and similarly compression mechanism 162 and heating element assembly 400 are in contact with each other or with the flexible material 100.

As discussed above, the heating assembly 400 includes one or more heating elements 450. The heating elements can be any material or design suitable to seal together adjacent plies together. In various embodiments the heating elements 450 can be resistive wire or foil. The wire or foil can be formed of nichrome, iron-chromium-aluminum, cupronickel or other metals suitable for forming and operating a heating element under conditions that are used for sealing plies of the flexible material together allowing the heating element 450 to melt, fuse, join, bind, or unite together the two plies 105,107. In a preferred embodiment, the heating element 450 is formed from about 80% nickel and 20% chromium annealed soft. In other embodiments, the heating element 450 can be a thin film heater element. The thin film heating element 450 can be formed of barium titanate and lead titanate composites or other materials suitable for forming and operating the heating element under conditions that allow the heating element 450 to obtain a sufficient heat to seal the plies together. In accordance with various embodiments, the heating element 450 heats up to between about 300° to 500° F. Preferably the heating element 450 reaches about 400° F. The ends of the heating element reach a lower heat of between about 125° to 225° F. Preferably the ends reach about 180° F.

Figure 8A:
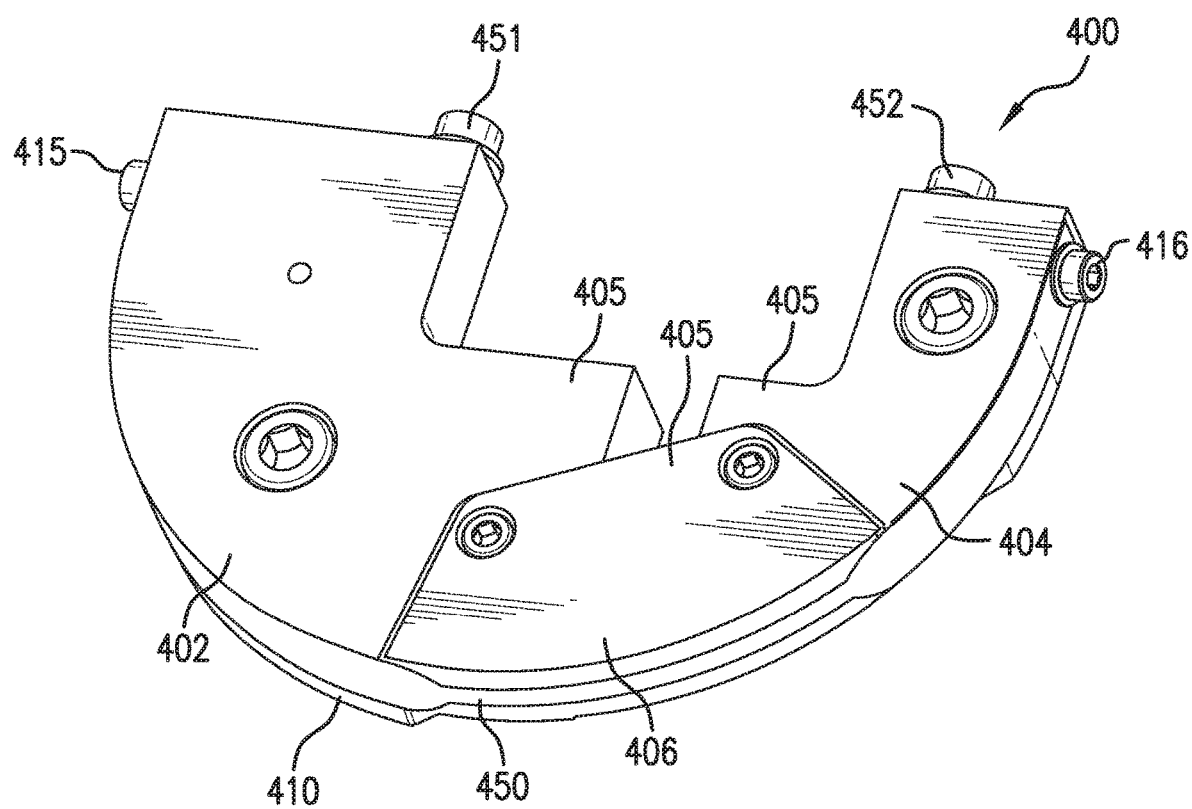
FIG. 8A is a perspective view of a heating assembly of the inflation and sealing system of FIG. 2.
Figure 8B:
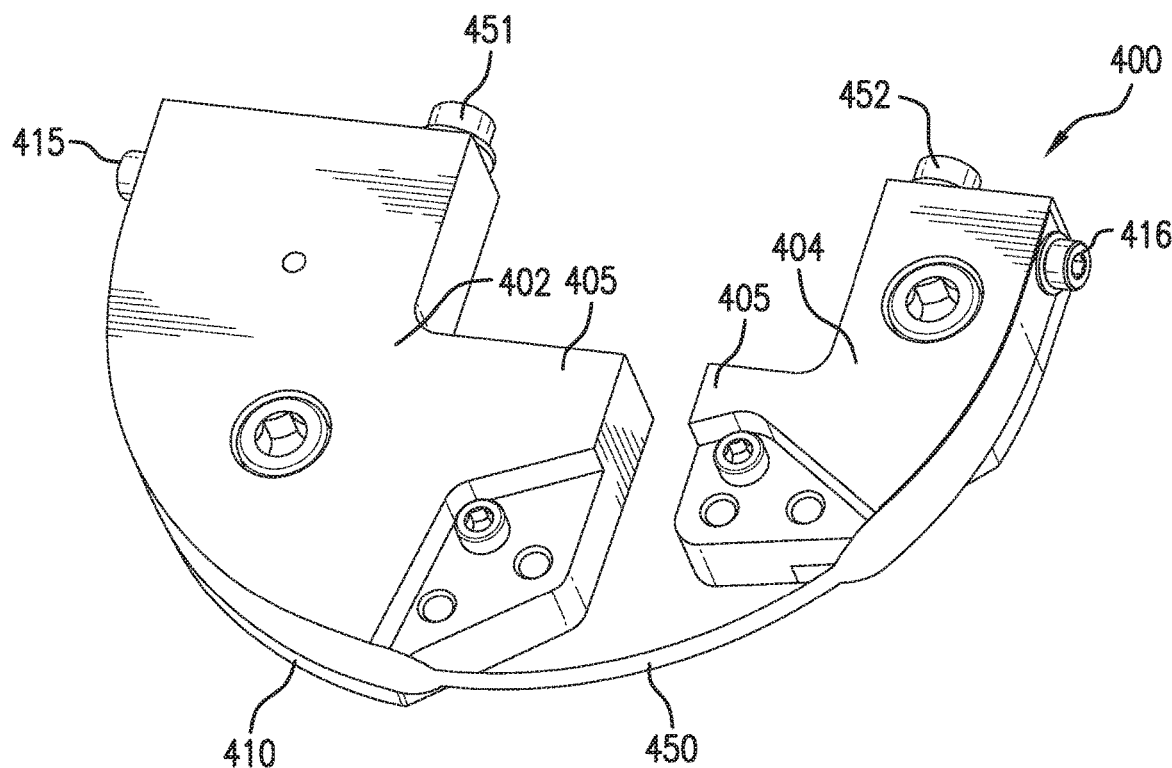
FIG. 8B is a perspective view thereof with an insulator block removed for clarity.
Figure 8C:
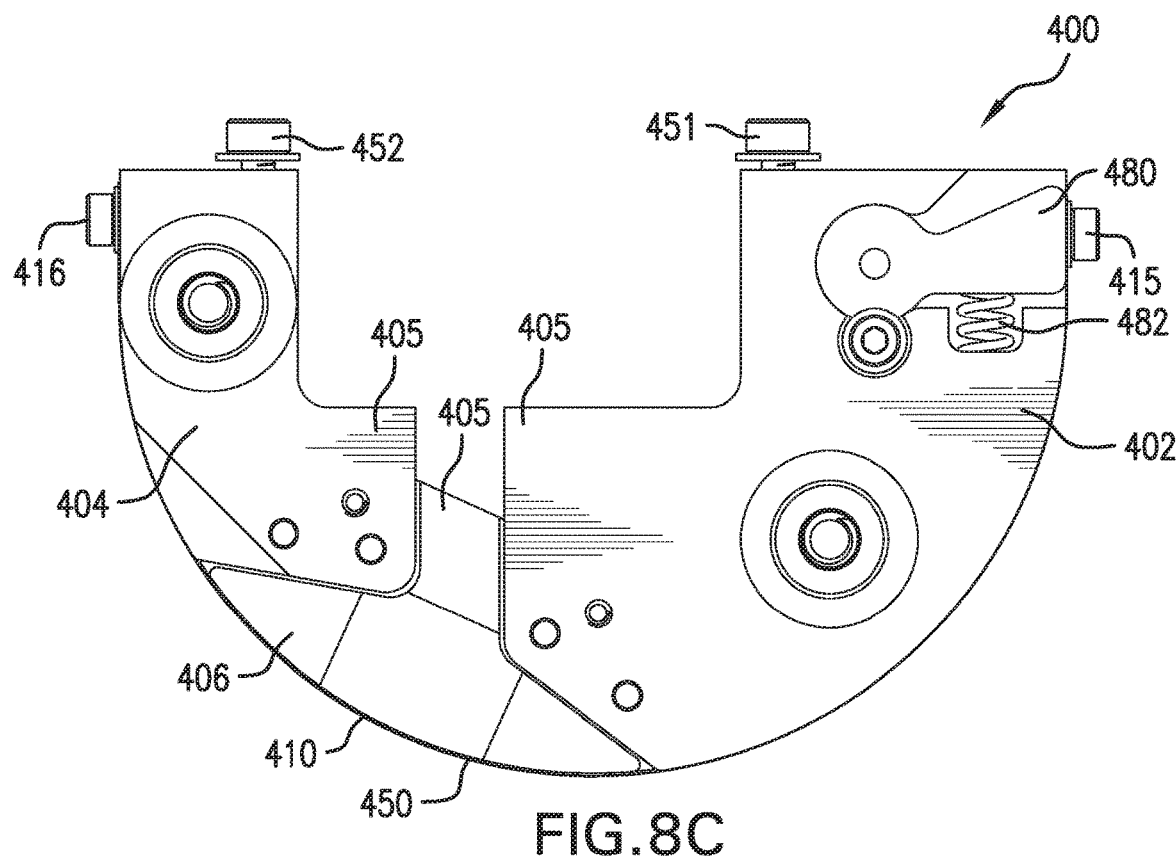
FIG. 8C is a distal side view of the heating assembly of FIG. 8A.
Figure 8D:
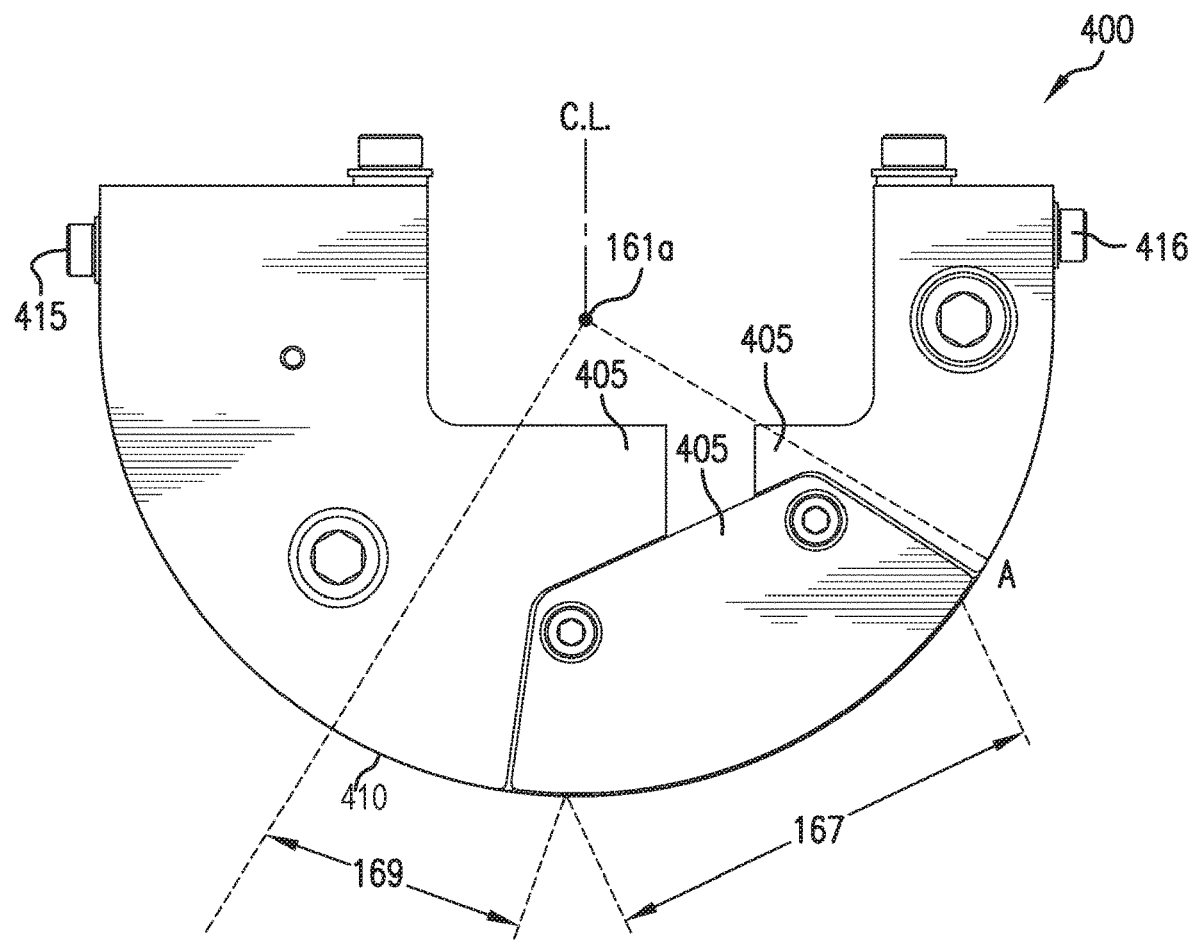
FIG. 8D is a proximal side view thereof.
Figure 8E:
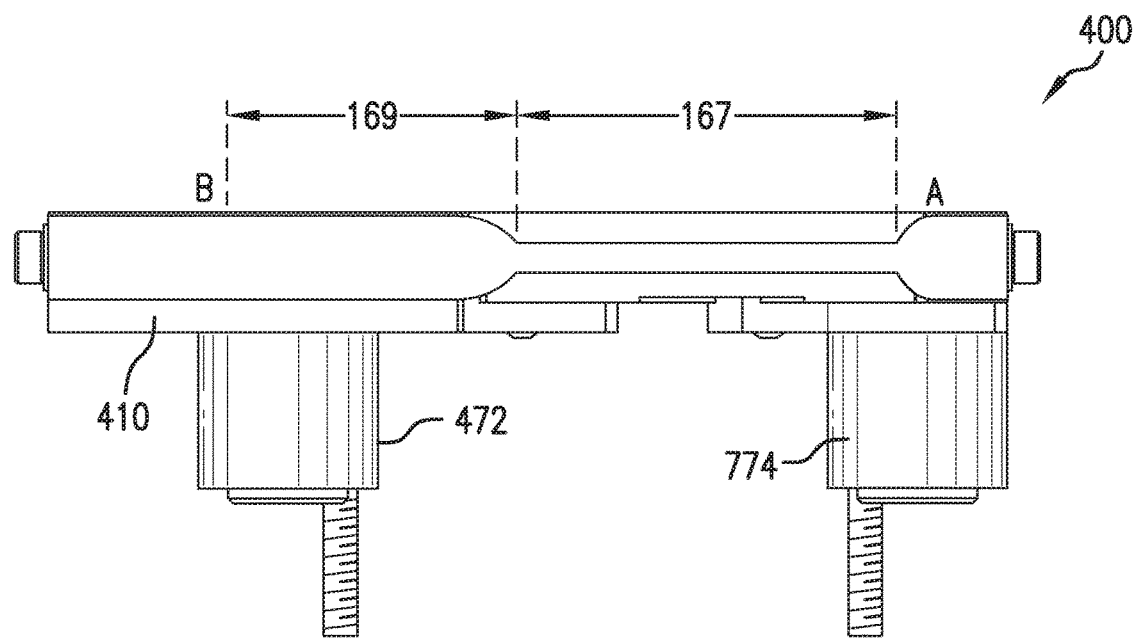
FIG. 8E is a bottom view thereof.
Figure 8F:
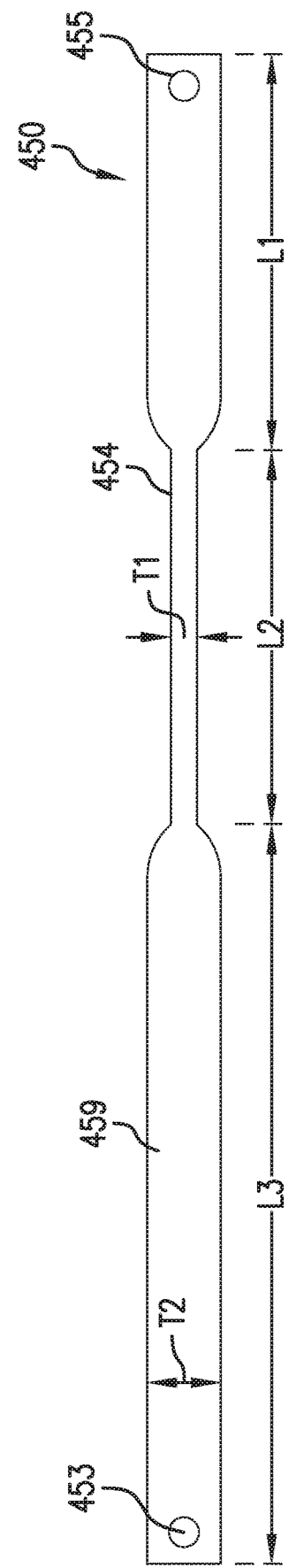
FIG. 8F is a flat view of a heating element of FIG. 8A.

In accordance with various embodiments, as illustrated in FIG. 8F, the heating element includes a high heat portion 454 and a low heat portion 459. The high heat portion 454 is defined by a portion of the heating element's 450 length with a reduced cross-section. The reduced cross-section increases the resistance in the heating element. The increased resistance causes the heating element 450 to significantly increase in temperature across the high heat portion 454 that is sufficient to heat the plies to create the longitudinal seal that seals the first and second plies of film together. The low heat portion 459 is defined by regions of the heating element that have a larger cross-section than the low heat portion. The larger cross-sections have a lower resistance in response to an applied current resulting in a lower temperature of the low heat portion 459. In various embodiments, the low heat portion is significantly above ambient temperature of the sealing device. In various embodiments, the high heat portion 454 is located closer to one end of the heating element 450 than the other end of the heating element 450. This offset position allows the high heat portion 454 to be offset on the upstream end of the pinch zone discussed above.

In accordance with an example of the heating element 450, the heating element 450 is about 7 to 7½ inches. The heating element 450 includes a first low heat portion 459 having a length L3 of between 3¼ to 3¾. The heating element 450 includes a second low heat portion 459 having a length L1 of between about 1¾ to 2¼. The low heat portions are about ¼ to ⅜ inches wide. The low heat portions are connected at a high heat portion 454 with a length L2 of between about 1½ and 2 inches. The element is about ⅛ of an inch wide. The heating element 450 may be from 1-5 mils thick and preferably about 3 mils thick. In response to a current being applied across the heating element 450, the low heat portion heats up to about 180° F. and the high heat portion heats up to about 400° F.

In accordance with various embodiments, as illustrated in FIG. 8F, the heating element includes connection elements 453 and 455 one each end suitable to attach to the heating assembly 400. In one example the connection elements are apertures operable to be connected to connection elements 415/416 on the heating support structure 405.

In accordance with various embodiments, a low friction layer 460 is located between the stationary heating element 450 and the moving roller 162 or flexible material 100. The low friction layer 460 is suitable to decrease the wear between the roller 162 and the heating element 450. In embodiments having a heating element 450, the low friction layer 460 decreases abrasion to the element and may also limit the tendency of the heating element 450 to cut into the flexible material 100 during sealing. In embodiments having a thin film heat element 450, the low friction layer 460 decreases abrasion to the substrate supporting the heating element 450 and the heating element 450 itself. As the thin film heat element 450 tends to be structurally thinner than wire heating elements, the low friction layer 460 also limits the deterioration of the thin film heating element 450 due to abrasion. The low friction layer 460 also allows for smoother transition of the flexible material 100 across the heating element 450 improving the seal. In one example, the low friction layer is a thin strip of polytetrafluoroethylene (PTFE) attached across the exposed portion of the heating element 450. Additionally by using the PTFE as a wear element, the layer can be replaced without replacing the more expensive heater element. The PTFE can be attached as a tape to the heating element and surrounding components. A non-adhesive layer of PTFE can also be mechanically positioned relative to the heating element. Mechanical fixturing allows the swapping out of parts without concern over the adhesive. For example, screw attachments or clips or other mechanical hardware to hold the PTFE in place or a housing can be molded to accommodate the layer. In other examples, other low fiction materials that can accommodate the heat created at the heating element 450 such as silicone are applied.

In accordance with one embodiment as illustrated in FIGS. 8A-8E, the heating element 450 is a NiChrome wire or foil. The heating element 450 includes the NiChrome wire 450 stretched across an insulator block 406. Each side of the NiChrome wire 450 is attached to contacts 415 and 416. Electrical leads 451 and 452 are connected to the contacts 415 and 416 such that current can be provided to the heating element 450 to cause it to heat up. By controlling the width of the wire the heat output is affected. For example, narrowing the wire width increases the heat output compared to the same electrical input. This has the drawback however of narrowing the seal formed on the flexible material. In some examples, the seal width is controlled by providing multiple traces of wire for the heating element.

In accordance with one embodiment as illustrated in FIGS. 8A-8E, the heating element 450 is a thin film heater. In such embodiments, the heating element assembly 410 includes a heating element 450 having a thin film heat trace that connects two contacts. The heating element 450 can be suspended by a substrate. For example, the heating element assembly includes a polyimide substrate that backs the heat trace. The heating element 450 can be sandwiched between two layers of substrate. The heating element 410 can formed by vapor deposition on a polyimide layer. In one example, the polyimide layers are between about 1 and 3 mils thick. In a preferred example, the polyimide layers are about 2 mils thick each. The polyimide layers sandwich the heat trace 450, which in one example is between about 1 and 3 mils thick. In a preferred example, the heat trace 450 is about 2 mils thick. The polyimide layers encapsulate the heat trace and provide isolative properties. The process that binds the polyimide together handles the temperature that the heating element 450 is capable of creating, eliminating the need for adhesives. Typically the adhesives have a lower functional temperature and as such are generally avoided with heating elements. In addition one variable is eliminated from the assembly by bonding the polyimide directly to itself.

In other embodiments the heating element 450 circuit can be formed of layers of fluorinated ethylene propylene (FEP) on the heat trace 450. In this structure high heat and high pressure negates a need to use an adhesive. Also the outer layer of FEP can be textured to decrease friction and sticking with other components. In other embodiments, the thin film circuit 410 can be subsequently wrapped in another material such as silicone providing additional protection, provides insulation, acts as a bonding agent and provides additional manufacturing options such as over-molding of the circuit.

The heating element 450 is held in tension across a backing block 406. Each of the two contacts on the heating assembly 400 is connected to heating assembly contacts 415 and 416, which in turn are connected to electrical leads 451 and 452. In any of the heating assembly embodiments discussed herein, the heating element 410, contacts 415/416, and the insulator block may be positioned inside our outside of the structure of heating assembly 400. The low friction layer 460 may also be applied along the surface 410.

In various example, the housing of heating assembly 400 has an elongated "U" shape suitably sized to the belt path and web path through the pinch zone 176 alone surface 410 of the "U" shaped housing while the housing remains stationary. The housing can also include standoffs 472 and 474 suitable to align the housing 420 with the belts 163 and/or 164. In one example, the standoffs attach to the plate 185 and space the housing away from the plate the proper distance to align the housing belts. The standoffs 472 and 474 also can house the electrical leads respectively. While it is discussed herein by way of example, that the heating assembly 400 aligns with a belt drive mechanism, it should be appreciated that other embodiments are also covered, such as alignment with the end of a roller or drum, or alignment with a belt drive mechanism, or any structural relationship that allows the flexible material to be conveyed past the stationary heating assembly. In another embodiment, the flexible material could be stationary and the heating assembly driven across the stationary flexible material.

In accordance with various embodiments, the heat sealer assembly 400 includes a tension mechanism for the heating element 410. The tensioning mechanism is a system configured to hold tension in the heating element 410 across the backing block 406. As the heating element heats up and cools down, the length and/or structure of the heating element changes. These changes can modify the relationship between the heating element 410 and the surrounding components or the flexible material 100. In wire applications, the change in length of the wire heating element can be sufficiently large causing poor seals to form and potentially causing the wire heating element to cut the flexible material 100. As the heating element due to increase in temperature the added length of the heating element is "absorbed" by the tension mechanism allowing the heating element to remain flush against the backing block and stay in position. When the heating element is not flush against the backing block, there is the potential of cutting the film as you seal. Constant pressure will provide a consistent seal. In various embodiments, one or more of the contacts 415 and 416 can be resilient thus providing a force to stretch the heating element across the backing block 406. In one example, shown in FIG. 8C, the contact block 402 includes a lever and spring, placing the heating element 450 in tension. The spring 482 is suspended on a shelf in the housing of block 402 allowing the lever 480 to pivot away from the spring 482 placing the heating element 450 in tension. The spring tensioning mechanism also allows for changes in tension in the heating element during thermal expansion.

In another example, as shown in FIG. 8C, the tension mechanism can be built into the heating element assembly 400. The thickness of the heat trace or physical pattern can be modified to provide various watt densities. The thin film element can have varying widths and lengths by changing the trace composition. The thin film element is also smoother decreasing or eliminating the likelihood of cutting the flexible material 100 with the heating element.

While the various embodiments and examples discussed herein are directed to a heating assembly 400 that is stationary, it should be appreciated that various features or elements of the various embodiments and examples discussed herein are applicable to some moving heating assemblies as well. In one example, the heating assembly 400 includes the disk 300. Thus, some of the heating element assembly structures could move with the drive mechanism while others remain stationary. In another example, some of the heating element tensioning mechanisms could apply to moving heating assemblies. In other embodiments, the heating element assembly may move with the drive elements, be stationary relative to the moving drive elements, move relative to the movement of the compression mechanisms, move relative to the web material 100, or be stationary relative to the housing 141. Persons of ordinary skill in the art, based on the disclosure herein, can adapt these features and elements to a variety of other systems only some of which are disclosed herein in detail.

After being sealed, the first and second plies 105,107 are cooled under pressure along the cooling zone 169 allowing the seal to harden. The cooling zone 169 may act a heat sink or may provide a sufficient cooling time for the heat to dissipate into the air.

In the preferred embodiment, the heating assembly 400 and one or more of the compression mechanisms 161, 162 cooperatively press or pinch the first and second plies 105,107 at the first pinch area 176 against the heating assembly 400 to seal the two plies together. The sealing assembly 103 may rely on pressure from compression mechanism 162 against the heating assembly 400 to sufficiently press or pinch the plies 105,107 there-between.

In accordance with various embodiments, the inflation and sealing assembly 132 may further include a cutting assembly 250 to cut the web material 100. Preferably, the cutting member is sufficient to cut the web material 100 as it is moved past the edge along the material path "E". More particularly, the cutting assembly 250 may cut the first and second plies 105, 107 between the first longitudinal edge 101 and mouth 125 of the chambers. In some configurations, the cutting assembly 250 may cut the web material 100 to open the inflation channel 114 of the web material 100 and remove the first and second plies 105, 107 from the inflation nozzle 140. In various embodiments, the inflation channel 114 of the flexible structure can be central to the structure or in other locations. In such embodiments, the cutting assembly 250 can still be adapted to remove the inflation channel 114 from the inflation and sealing assembly, particularly the nozzle 140.

Any and all references specifically identified in the specification of the present application are expressly incorporated herein in their entirety by reference thereto. The term "about," as used herein, should generally be understood to refer to both the corresponding number and a range of numbers. Moreover, all numerical ranges herein should be understood to include each whole integer within the range.

Having described several embodiments herein, it will be recognized by those skilled in the art that various modifications, alternative constructions, and equivalents may be used. The various examples and embodiments may be employed separately or they may be mixed and matched in combination to form any iteration of the alternatives. Additionally, a number of well-known processes and elements have not been described in order to avoid unnecessarily obscuring the focus of the present disclosure. Accordingly, the above description should not be taken as limiting the scope of the invention. Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

The invention claimed is:

1. A protective packaging formation device, comprising:
   an inflation assembly having a fluid conduit that directs fluid between first and second overlapping plies of a web material;
   a driving mechanism that drives the overlapping plies in a downstream direction through a path that includes a pinch zone; and
   a sealing mechanism that includes a heating element, the heating element including a foil that includes a wide cross-section portion and a reduced cross-section portion, the size of the cross-sections selected such that the reduced cross-section portion produces a high temperature zone that outputs sufficient heat to heat seal the plies to create a longitudinal seal that seals the first and second plies of film together, trapping the fluid therebetween as the driving mechanism drives the web past the high temperature zone in the downstream direction, wherein the wide cross-section portion and the reduced cross-section portion are disposed in the pinch zone.

2. The protective packaging formation device of claim 1, wherein the drive mechanism includes a belt, and the web is separated from the heating element by the belt.

3. The protective packaging formation device of claim 1, wherein the drive mechanism includes a first belt and a second belt that advances the web through the pinch zone.

4. The protective packaging formation device of claim 1, wherein the wide cross-section portion has a heat output that is insufficient to heat seal the plies together.

5. The protective packaging formation device of claim 4, wherein the sealing mechanism includes an electrical supply connected to the heating element configured to deliver an electrical current across the heating element, wherein the supply and the widths are selected such that the heat output of the wide cross-section is insufficient to heat seal the plies together when the electrical supply applies a current across the foil.

6. The protective packaging formation device of claim 1, wherein the wide cross-section portion extends into a cooling zone disposed downstream of the high temperature zone and having a heat output that is sufficiently low to allow the longitudinal seal to cool, the drive mechanism operably associated with the sealing mechanism to compress the plies against the wide cross-section portion as the driving mechanism drives the plies along the cooling zone in the downstream direction.

7. The protective packaging formation device of claim 1, wherein the driving mechanism is configured to drive the plies along the path over an arcuate pinch zone, such that the overlapping plies have an arcuate shape of at least 15°.

8. A protective packaging formation device, comprising:
   an inflation assembly having a fluid conduit that directs fluid between first and second overlapping plies of a web material;
   a driving mechanism that drives the overlapping plies in a downstream direction through a path that includes an elongated arcuate pinch zone, such that the overlapping plies have an arcuate shape in the arcuate pinch zone; and
   a sealing mechanism that includes a heating element that includes a wide cross-section portion and a reduced cross-section portion, the size of the cross-sections selected such that the reduced cross-section portion produces a high temperature zone that outputs sufficient heat to heat seal the plies to create a longitudinal seal that seals the first and second plies of film together, trapping the fluid therebetween as the driving mechanism drives the web past the heating element in the downstream direction, wherein the wide cross-section portion and the reduced cross-section portion are disposed in the arcuate pinch zone,
   wherein the sealing mechanism includes an arcuate heater support structure that has an arcuate support surface that supports the heating element and defines an arcuate profile of the arcuate pinch zone, which arcuate support surface applies pressure to the web against an opposing compression-element.

9. The protective packaging formation device of claim 8, wherein the heater support structure includes an insulating member that includes at least a portion of the arcuate support surface, along which the support surface has the arcuate profile.

10. The protective packaging formation device of claim 9, wherein the heater support structure includes a first conducting member and a second conducting member that is separated from the first conducting member, and the heating element has a first end and a second end, with each end mounted to the separate conducting members, wherein the heating element is laid over the insulating member with the reduced cross-section laid across the insulating member.

11. The protective packaging formation device of claim 10, wherein the heating element is laid over portions of the conducting members with wide cross-section portion of the heating element being laid across the portions of the conducting members.

12. The protective packaging formation device of claim 11, wherein the reduced cross-section portion of the heating element occupies more of the first half of the pinch zone than the second half.

13. The protective packaging formation device of claim 12, wherein the wide cross-section portion includes a cooling zone downstream of the high temperature zone, the cooling zone having a heat output that is sufficiently low to allow the longitudinal seal to cool.

14. A protective packaging formation device, comprising:
an inflation assembly that directs fluid between first and second overlapping plies of a web material;
a sealing mechanism that includes:
a heating zone and a cooling zone, wherein the heating zone is operable to heat the plies to create a longitudinal heat seal that seals the first and second plies together as the plies are driven over the heating zone in a downstream direction, and the cooling zone disposed downstream of the heating zone is operable to allow the heated plies to cool at the longitudinal heat seal as the web is driven over the heating zone in the downstream direction, such that the cooled longitudinal heat seal retains the fluid between the plies; and
a heating element that extends along both the heating zone and the cooling zone, with the heating element having a first profile in the heating zone, for heating the heating zone, and a second profile in the cooling zone, providing less heat in the cooling zone than in the heating zone; and
a driving mechanism that drives the overlapping plies in a downstream direction along a path that extends over the heating and cooling zones.

15. The protective packaging formation device of claim 14, wherein the sealing mechanism includes a heater support structure that defines an arcuate web-support surface that supports the heating element and defines the path, such that the path is arcuate over the heating and cooling zones.

16. The protective packaging formation device of claim 15, wherein the heating element is a nichrome foil heater that follows the arcuate web-support surface through the pinch zone.

17. The protective packaging formation device of claim 14, wherein the sealing mechanism includes a pinch zone that overlaps longitudinally with the heating zone and cooling zone, the pinch zone being defined between opposing compression elements in which the compression elements pinch the plies against the heating element in the heating zone and cooling zone.

18. The protective packaging formation device of claim 17, wherein the heating element extends the entire length of the pinch zone.

19. The protective packaging formation device of claim 14, wherein:
the sealing mechanism includes an electric insulating member and electrically conductive supports that provide electrical current to the heating element; and
the heating element is laid over the insulating member in the heating zone and is located along at least one of the electrically conductive supports in the cooling zone.

20. The protective packaging formation device of claim 19, wherein the heating zone is defined by a length of the heating element with a reduced cross section.

21. The protective packaging formation device of claim 19, wherein the heating zone is between about ¼ and ½ the length of the heating element.

22. The protective packaging formation device of claim 19, wherein the heating zone is between about ½ and % the length of the pinch zone.

23. The protective packaging formation device of claim 19, wherein the cooling zone is between about ¼ and ½ the length of the pinch zone.

24. The protective packaging formation device of claim 19, wherein the difference between the first profile and the second profile is a change in cross-section of the heating element.

* * * * *